US010797606B2

(12) United States Patent
Mayell et al.

(10) Patent No.: US 10,797,606 B2
(45) Date of Patent: Oct. 6, 2020

(54) CONTROLLER WITH LIMIT CONTROL TO CHANGE SWITCHING PERIOD OR SWITCHING FREQUENCY OF POWER CONVERTER AND METHODS THEREOF

(71) Applicant: POWER INTEGRATIONS, INC., San Jose, CA (US)

(72) Inventors: Robert J. Mayell, Los Altos, CA (US); Roger Colbeck, Ottawa (CA); Hartley Fred Horwitz, Ottawa (CA); Igor Miletic, Ottawa (CA)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 16/219,539

(22) Filed: Dec. 13, 2018

(65) Prior Publication Data

US 2020/0195161 A1 Jun. 18, 2020

(51) Int. Cl.
*H02M 3/335* (2006.01)
*H02M 1/08* (2006.01)
*H02M 1/00* (2006.01)

(52) U.S. Cl.
CPC ......... *H02M 3/33592* (2013.01); *H02M 1/08* (2013.01); *H02M 2001/0029* (2013.01); *H02M 2001/0041* (2013.01); *H02M 2001/0058* (2013.01)

(58) Field of Classification Search
CPC ............................................. H02M 3/335–337
See application file for complete search history.

(56) References Cited

U.S. PATENT DOCUMENTS

| 9,250,640 | B1 | 2/2016 | Chakraborty |
| 10,050,546 | B1 | 8/2018 | Choi et al. |
| 10,069,403 | B1 | 9/2018 | Lim et al. |
| 2007/0139984 | A1* | 6/2007 | Lo ...................... H02M 1/4216 363/89 |

(Continued)

OTHER PUBLICATIONS

TEA19161T—Digital Controller for High-Efficiency Resonant Power Supply, Rev. 1, Mar. 10, 2016, 46 pages.

(Continued)

*Primary Examiner* — Thienvu V Tran
*Assistant Examiner* — Nusrat Quddus
(74) *Attorney, Agent, or Firm* — Christensen O'Connor Johnson Kindness PLLC

(57) ABSTRACT

A power converter controller includes a control loop clock generator that generates a switching frequency signal in response to a sense signal representative of a characteristic of the power converter, a load signal responsive to an output load, and a limit signal representative of a maximum length of a current half cycle of the switching frequency signal. A comparator generates an enable signal in response to the load signal and a load threshold. A limit control generates the limit signal in response to the enable signal and the switching frequency signal. A rate of change of half cycles of the switching frequency signal is controlled in response to the limit signal. A request transmitter generates a request signal in response to the switching frequency signal to control switching of a switching circuit coupled to the energy transfer element and an input of the power converter.

38 Claims, 13 Drawing Sheets

(56) References Cited

U.S. PATENT DOCUMENTS

| | | | |
|---|---|---|---|
| 2008/0198638 A1* | 8/2008 | Reinberger | H02M 3/3376 363/74 |
| 2012/0043905 A1 | 2/2012 | Christensen et al. | |
| 2012/0250360 A1* | 10/2012 | Orr | H02M 3/3376 363/21.02 |
| 2012/0250378 A1* | 10/2012 | Kok | H02M 3/156 363/78 |
| 2013/0229829 A1* | 9/2013 | Zhang | H02M 3/33546 363/16 |
| 2013/0293267 A1 | 11/2013 | Gravati et al. | |
| 2014/0009978 A1* | 1/2014 | Brinlee | H02M 1/4225 363/25 |
| 2014/0078784 A1 | 3/2014 | Nishijima | |
| 2016/0057822 A1* | 2/2016 | Chu | H02M 1/4208 315/201 |

OTHER PUBLICATIONS

International Patent Application No. PCT/US2019/065433—International Search Report and Written Opinion dated Apr. 9, 2020, 18 pages.

* cited by examiner

CONTROLLER WITH LIMIT CONTROL TO CHANGE SWITCHING PERIOD OR SWITCHING FREQUENCY OF POWER CONVERTER AND METHODS THEREOF

BACKGROUND INFORMATION

Field of the Disclosure

The present invention relates generally to power converters, and more specifically to switched mode power converters.

Background

Electronic devices use power to operate. Switched mode power converters are commonly used due to their high efficiency, small size, and low weight to power may of today's electronics. Conventional wall sockets provide a high voltage alternating current (ac). In a switching power converter, the high voltage ac input is converted to provide a well-regulated direct current (dc) output through an energy transfer element. The switched mode power converter usually provides output regulation by sensing one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter. Varying the duty cycle may be referred to as pulse width modulation (PWM) control, while varying the switching frequency may be referred to as pulse frequency modulation (PFM) control.

One type of switched mode power converter topology is a resonant switched mode power converter, which utilizes a resonant inductance-capacitance (LC) circuit as part of the power conversion process. In general, resonant switched mode power converters with PFM control may have some advantages compared to non-resonant converters, such as operating at higher switching frequencies with lower switching loss, utilizing smaller magnetic elements (and therefore utilizing smaller packaging), all while operating with high efficiency. Resonant power converters generally do not have waveforms with sharp edges (e.g., waveforms having high di/dt or dv/dt) and as such electromagnetic interference (EMI) performance may be improved, which allows the use of smaller EMI filters as compared to non-resonant converters.

LLC converters are a type of resonant switched mode power converter, which utilizes the resonance between two inductors and a capacitor. LLC converters are popular due to the savings on cost and size by utilizing the magnetizing and leakage inductance of the power converter's energy transfer element as part of the resonance component of the LLC converter. In addition, LLC converters may achieve stability when they are operated at above resonance (i.e., operated at a switching frequency greater than the resonant frequency of the LLC) with zero voltage switching, which may result in lower switching losses.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1A:
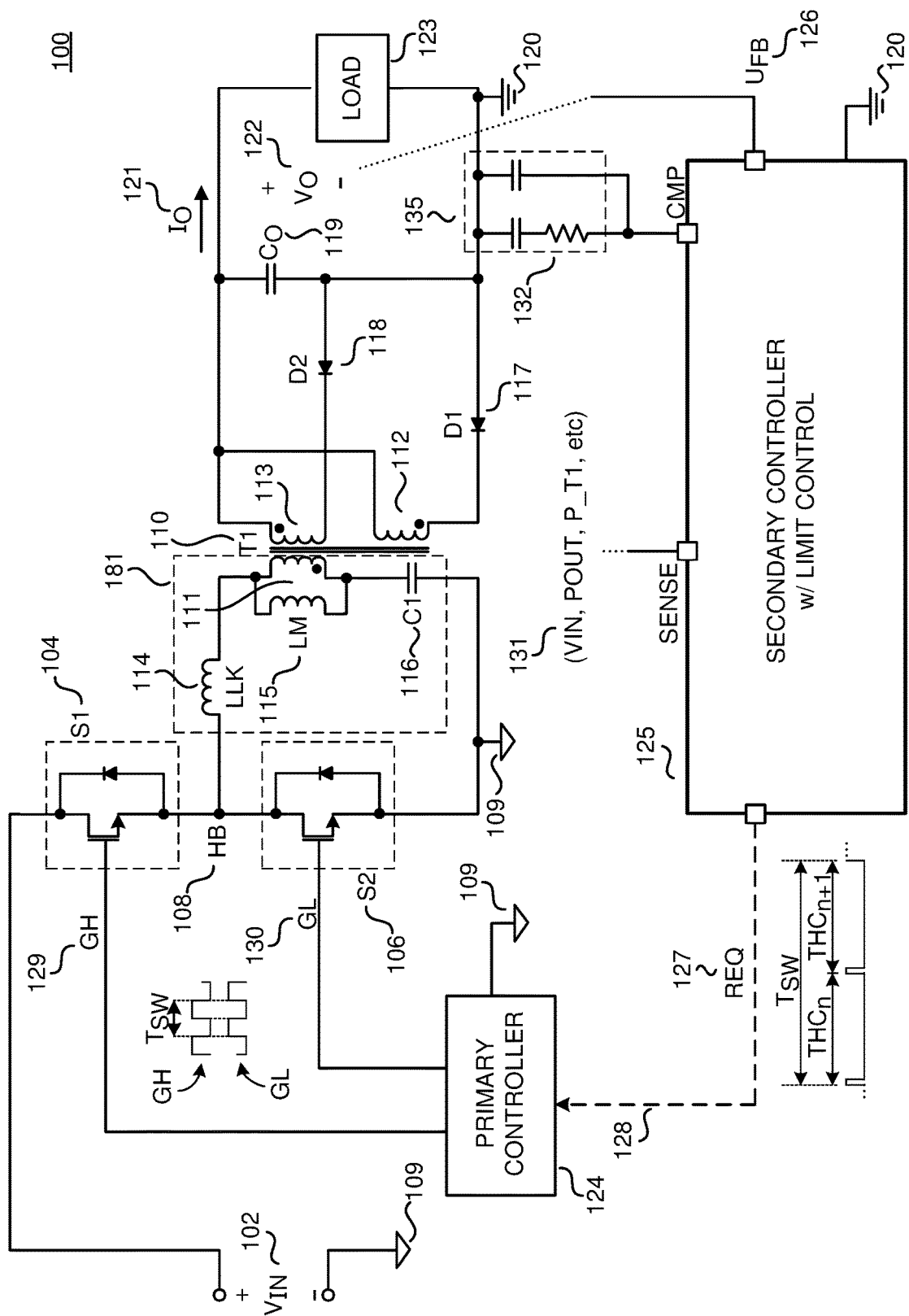
FIG. 1A is a functional block diagram illustrating one example of a power converter with a secondary controller with limit control in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of a resonant switched mode power converter with a limit control to control a change rate of a switching period or a switching frequency are described herein. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example," or "an example" means that a particular feature, structure or characteristic described in connection with the embodiment or example is included in at least one embodiment of the present invention. Thus, appearances of the phrases "in one embodiment," "in an embodiment," "one example," or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Resonant converters, such as LLC converters, typically include a resonant tank circuit that includes a tank inductance and a tank capacitance, as found for instance in LLC circuits. Resonant converters may take advantage of soft switching control to convert output power without the associated high switching losses, high switching stress on the power switch, and high EMI caused by fast switching edges.

Soft switching the power switch of an LLC converter may also enable zero voltage switching (ZVS) in which the voltage across the power switch is zero prior to or at the instant the power switch is turned ON which may reduce the switching losses for the LLC converter. For an example of a half-bridge LLC converter, two power switches (referred to as a high side switch and a low side switch in a half bridge switching circuit) are used to control the transfer of energy from the input of the power converter to the output of the power converter. The power switches are controlled such that when one power switch is ON, the other power switch is OFF, and the two power switches are generally controlled to be ON for substantially equal amounts of time under steady-state conditions. In general, a switch that is ON (or closed), may conduct current, while a switch that is OFF (or open) does not typically conduct current. In one example, the first switch is ON while the second switch is OFF. The first switch is turned OFF with a non-zero current. After the first switch turns OFF, the voltage across the second switch will reduce towards zero.

Soft switching generally refers to turning ON the second switch as the voltage across the second switch reaches near-zero. Using this type of switching prevents energy loss from discharge of the capacitance across the terminals of the switch during switch turn-on. To achieve ZVS, the power switches are controlled such that there is a period of time, referred to as "dead time," where both power switches are OFF prior to one of the power switches turning ON. Further, during the "dead time" period when both switches are OFF, the voltage across one of the power switches may be reduced to zero and once at zero volts, this switch could be turned ON with minimal switching loss (achieving ZVS).

In other words, soft switching generally may refer to turning on either the high side switch or the low side switch when there is non-zero tank current in the resonant tank circuit of an LLC converter and the voltage across the terminals of the high side switch or the low side switch is at a minimum. Hard switching generally refers to turning on the high side switch or the low side switch when the tank current is substantially zero or is flowing in the opposite direction and the voltage across the terminals of the high side switch or low side switch is substantially non-zero. When the high side switch and low side switches are hard switching (ZVS is not possible), switching losses occur. Under certain conditions, there may be substantially zero tank current in the resonant tank circuit, or the tank current has reversed directions prior to the switch turning off. In one example, the tank current is zero when both the high side switch and the low side switch have been turned off for a long enough period of time such that there is no tank current. In another example, a load increase at the output of the power converter could lead to a depletion of the tank current. As the load increases, the resonant converter may enter into an "overload condition" and too much energy is taken from the resonant tank circuit and the remaining tank current at the instant of switch turn-off approaches zero.

For an example of a half-bridge LLC converter, the high side switch and low side switch are generally controlled to be ON for substantially equal amounts of time under steady-state conditions and their operation may be characterized by its switching period, which is the inverse of the switching frequency. Ignoring the deadtime when both switches are off, in general, the on-time of either the high side switch or low side switch is substantially equal to the off-time under steady-state conditions. As such, the switching period may be made up of two half cycles, which are substantially equal under steady state conditions. During one of these two half cycles, either the high side switch or the low side switch is ON. For the subsequent half cycle, the switch that was not conducting during the previous half cycle is ON and the switch that was previously conducting is now OFF.

For the LLC converter to deliver more power, the switching period of the high side switch and the low side switch is increased (i.e., the switching frequency is decreased). As such, the periods of the half cycles (thus the on-times of the power switches) are also increased. When the load suddenly increases, the sudden increase in the switching period (and as such, periods of the half cycles) can cause too much energy to be taken from the resonant tank circuit and the end of cycle tank current (at the end of a half cycle) approaches zero.

As will be discussed, examples in accordance with the teachings of the present invention utilize a limit control to control how quickly the switching period/frequency can change. The limit control is further utilized to control how quickly the half cycles of the switching period may change. In particular, examples of the limit control in accordance with the teachings of the present invention control the rate of change that the half cycles increase on a cycle by cycle basis (and thus the switching period increases/switching frequency decreases) and prevent the switching period from increasing too quickly to prevent the end of cycle tank current from falling to zero. By controlling the rate of change for the half-cycle/switching period/switching frequency, the power converter may control how much energy is delivered from the resonant tank to the system output load. By controlling the energy delivered from the resonant tank to the system load, the power converter may avoid hard-switching or recover from hard-switching when it is detected.

In one example, the limit control is coupled to monitor the lengths of the half cycles of the switching period/frequency. When the limit control is enabled, the limit control outputs a limit signal TLIM representative of the maximum length of a half cycle in response to the previously sensed length of the half cycle. As such, the limit control prevents the length of the next half cycle from exceeding the length of the previous half cycle plus a fixed amount K. In various examples, the limit control may monitor the half cycles from either a switching frequency signal FSW representative of the switching frequency/period of the power switches or a sense signal SENSE representative of the power delivered by the power converter.

The limit control may include a cycle counter/timer that receives either the switching frequency signal FSW or the sense signal SENSE to determine the length of the current half cycle. The cycle counter/timer also stores the length (period) of the previous half cycle. The length of the half cycle is provided to a limit generator via a half cycle signal THCn. When enabled, the limit generator determines the maximum length of the next half cycle THCn+1 in response to the length of the current half cycle THCn. Or in other words, the limit generator determines the maximum length of the current half cycle THCn in response to the length of the previous half cycle THCn−1. For example, the limit generator prevents the length of the next half cycle from exceeding the length of the previous half cycle plus a fixed amount K.

In one example, limit control may be enabled when load conditions at the output of the power converter are likely to cause hard switching (or other overload conditions), that could pull too much energy too quickly from the resonant tank circuit. Further, the limit control may respond and/or be enabled by sensed abnormal events. In one example, the limit control may respond to the sensed abnormal events by momentarily decreasing the maximum length of the half cycle based on the previous half cycle length before employing the fixed increase control.

FIG. 1A illustrates a functional block diagram of an example power converter 100 and controller including limit control in accordance with the teachings of the present invention. In the depicted example, power converter 100 includes a primary controller 124 and a secondary controller 125, which together may be referred to as the controller of the power converter 100. As shown, the primary controller 124 is on the primary side of the power converter 100 and referenced to input return 109 while the secondary controller 125 is on the secondary side of the power converter 100 referenced to output return 120. However, it should be appreciated that primary controller 124 and secondary controller 125 may not be isolated from each other and one or more elements included in the secondary controller 125 could be included in the primary controller 124 and vice versa. The power converter 100 shown is a resonant power converter coupled in a half-bridge topology with rectifiers at its output. It should be appreciated that other power converter topologies (resonant or not, isolated or non-isolated) could be used in accordance with the teachings of the present invention. Further, synchronous rectifiers may also be used for the output rectifiers.

In the depicted example, the power converter 100 is shown as including a switching circuit, which includes switches S1 104 and S2 106, coupled to an input of the power converter 100 and an energy transfer element T1 110 coupled between the input and the output of the power converter 100. The primary controller 124 is coupled to generate first and second drive signals GH 129 and GL 130 to control switching of switches S1 104 and S2 106, respectively. Switch S1 104 may also be referred to as a high side switch and switch S2 106 may be referred to as a low side switch. A resonant tank circuit 181 is also coupled to switches S1 104 and S2 106. The resonant tank circuit 181 includes a tank inductance and a tank capacitance. In the depicted example, the resonant tank circuit 181 is an LLC circuit such that the tank inductance includes a leakage inductance LLK 114 and a transformer magnetizing inductance LM 115 of the energy transfer element T1 110. The tank capacitance includes capacitance C1 116. The leakage inductance LLK 114 and the transformer magnetizing inductance LM 115 may be either discrete components (discrete magnetic structures), or combined into a single transformer (single magnetic structure) with leakage and magnetizing elements, such as the energy transfer element T1 110.

As illustrated, the power converter 100 is coupled to receive an input voltage VIN 102 on the primary side, and provide output power to a load 123 coupled to the output of the power converter 100 on the secondary side. High side switch S1 104 is coupled to receive the input voltage VIN 102 at one end, and coupled to the low side switch S2 106 at the other end. The low side switch S2 106 is further coupled to input return 109. The terminal between the high side switch S1 104 and the low side switch S2 106 may be referred to as the half bridge node HB 108. In the example shown, both the high side switch S1 104 and the low side switch S2 106 are illustrated as n-type metal-oxide-semiconductor field-effect transistors (MOSFETs) along with their respective body diodes. The high side switch S1 104 and the low side switch S2 106 are controlled with first and second drive signals GH 129 and GL 130 such that the voltage applied to the input of the resonant tank 181 (i.e. the voltage at the half bridge node HB 108) is substantially a square wave.

In one example shown, the energy transfer element T1 110 includes the primary winding 111, a first output winding 112, and a second output winding 113. It should be appreciated that the energy transfer element T1 110 may include more windings than those illustrated. These additional windings could be used for output power, bias power, or for small signal sense, etc. The dots on the windings of the energy transfer element T1 110 signify points of equivalent polarity of coupling between the windings. As illustrated, the primary winding 111 is coupled in parallel with the magnetizing inductor LM 115 so that the in-phase winding terminal, as indicated by the dot, connects to the capacitor C1 116. The primary winding 110 is coupled to the high side switch S1 104 and low side switch S2 106. The first output winding 112 is coupled to output rectifier D1 117 while the second output winding 113 is coupled to output rectifier D2 118. As shown, rectifiers D1 117 and D2 118 are diodes. However, in another example, rectifiers D1 117 and D2 118 may be transistors used as synchronous rectifiers and could be controlled by signals outputted by the secondary controller 125. Energy is transferred and rectified by output rectifier D1 117 when the high side switch S1 104 is turned ON and the low side switch S2 106 is turned OFF. When the high side switch S1 104 is turned OFF and the low side switch S2 106 is turned ON, energy is transferred and rectified by output rectifier D2 118. One end of the output capacitor $C_O$ 119 is coupled to rectifiers D1 117 and D2 118, and output return 120. The other end of the output capacitor $C_O$ 126 is coupled to the first output winding 112 and the second output winding 113. The load 123 is coupled across the output capacitor $C_O$ 119. An output may be provided to the load 123 and may be provided as either an output voltage $V_O$ 122, an output current $I_O$ 121, or a combination of the two.

As shown in the depicted example, example power converter 100 has a primary side and a secondary side, which in one example are galvanically isolated from each other. It should be appreciated that embodiments of the present disclosure may be used with non-isolated power converters as well. A controller coupled to the primary side on an input side of the power converter is generally referred to as a primary controller while a controller coupled to the secondary side on the output side of the power converter is referred to as a secondary controller. In one example, primary controller 124 and secondary controller 125 may communicate via a communication link 128 across the galvanic isolation and may use an inductive coupling such as a transformer or a coupled inductor. The primary controller 124 and secondary controller 125 may be implemented on separate integrated circuit (IC) dice that may either be co-packaged in a single IC package or packaged in separate IC packages. An integrated circuit package typically includes a lead frame to provide mechanical support for the die or dice within the IC package.

The power converter 100 further includes circuitry to regulate the output. A feedback signal $U_{FB}$ 126 representative of the output of the power converter 100 (e.g., output voltage $V_O$ 122, output current $I_O$ 121, or a combination of the two) is provided to the secondary controller 125 and may be a voltage signal or a current signal. The secondary controller 125 is coupled to receive the feedback signal $U_{FB}$ 126 and outputs a request signal REQ 127. In response to the feedback signal $U_{FB}$ 126, the secondary controller 125 determines whether energy should be delivered from the primary side to the secondary side of the power converter 100. Secondary controller 125 outputs the request signal REQ 127 to the primary controller 124 via the communication link 128. In one example, the communication link 128 maintains the galvanic isolation between primary controller 124 and the secondary controller 125 and may be implemented by using devices such as an opto-coupler, a capacitor, a magnetic coupling, or an inductive coupling. In one example, the inductive coupling that forms the communication link 128 may include conductive loops formed of lead frames included in packages that support the primary controller 124 and secondary controller 125.

The request signal REQ 127 may be representative of one or more commands to control the switching of the high side switch S1 104 and the low side switch S2 106. The request signal REQ 127 may be a rectangular pulse waveform that pulses to a logic high value and quickly returns to a logic low value. In one example, a grouping of M number of pulses in the request signal REQ 127 may correspond to a "burst on" command and the primary controller 124 begins switching either the high side switch S1 104 or the low side switch S2 106. A single pulse in the request signal REQ 127 may correspond to a "switch" command and the primary controller 124 turns OFF whichever high side switch S1 104 or low side switch S2 106 is currently conducting, and turns ON whichever switch is not currently conducting. Further, a grouping of N number of pulses in the request signal REQ 127 may correspond to a "burst off" command and the primary controller 124 stops switching both the high side switch S1 104 and the low side switch S2 106. The primary controller 124 may include a decoder to decode the commands from the request signal REQ 127. However, it should be appreciated that other schemes could be used to transmit burst on, burst off, and switch commands.

As shown in the illustrated example, secondary controller 125 determines the switching frequency or switching period of the high side switch S1 104 and the low side switch S2 106. In one example, the secondary controller 125 receives a sense signal SENSE 131 which may be representative of multiple characteristics of the power converter 100. In one example, the sense signal SENSE 131 can be representative of the input voltage $V_{IN}$ 102 and may be a voltage or current signal. The sense signal SENSE 131 can also be representative of the sensed output power (POUT), power delivered by the energy transfer element T1 110 (P_T1), input power or power processed by the converter and may be a voltage signal or a current signal. The secondary controller 125 utilizes the feedback signal $U_{FB}$ 126 and the sense signal SENSE 131 to determine the time between pulses of the request signal REQ 127, which is related to the switching frequency or switching period of the high side switch S1 104 and the low side switch S2 106 and the subsequent on-times of switch S1 104 and switch S2 106. However, it should be appreciated that the sense signal SENSE 131 may be optional. As such, the secondary controller 125 utilizes the feedback signal $U_{FB}$ 126 to determine the time between pulses of the request signal REQ 127 and the subsequent on-times of switch S1 104 and switch S2 106.

As will be further discussed, the secondary controller 125 also includes limit control, which limits the time between pulses of the request signal REQ 127 when enabled. In other words, the limit control can control how quickly the switching period/frequency can change for the high side switch S1 104 and the low side switch S2 106. In particular, examples of the limit control can control the rate at which the time between request pulses of the request signal REQ 127 (i.e., $THC_n$ and $THC_{n+1}$) increases on a cycle by cycle basis (and thus limits the rate at which the switching period increases and the switching frequency decreases for the high side switch S1 104 and low side switch S2 106). As such, the controller with limit control can prevent the switching period from increasing too quickly to prevent the end of cycle tank current from falling to zero or flowing in the opposite direction. The controller with limit control can also prevent the switching period from increasing too rapidly during startup prior to regulation, in maximum power delivery mode, when providing a soft-start function, or after a triggered limit (decrement) event. By controlling the rate of change for the time between request pulses of the request signal REQ 127, the power converter 100 may control how much energy is taken from the resonant tank 118. As will be further discussed, the limit control can also decrease the switching period by a decrement value. Further, the limit control can optionally control the rate at which the time between request pulses of the request signal REQ 127 (i.e., $THC_n$ and $THC_{n+1}$) decreases and thus limit the rate at which the switching period decreases and the switching frequency increases. Maximum and minimum frequency limits may be imposed by the limit control such that the switching frequency for the high side switch S1 104 and low side switch S2 106 does not exceed a maximum frequency $f_{MAX}$ nor be less than a minimum frequency $f_{MIN}$.

Figure 1B:
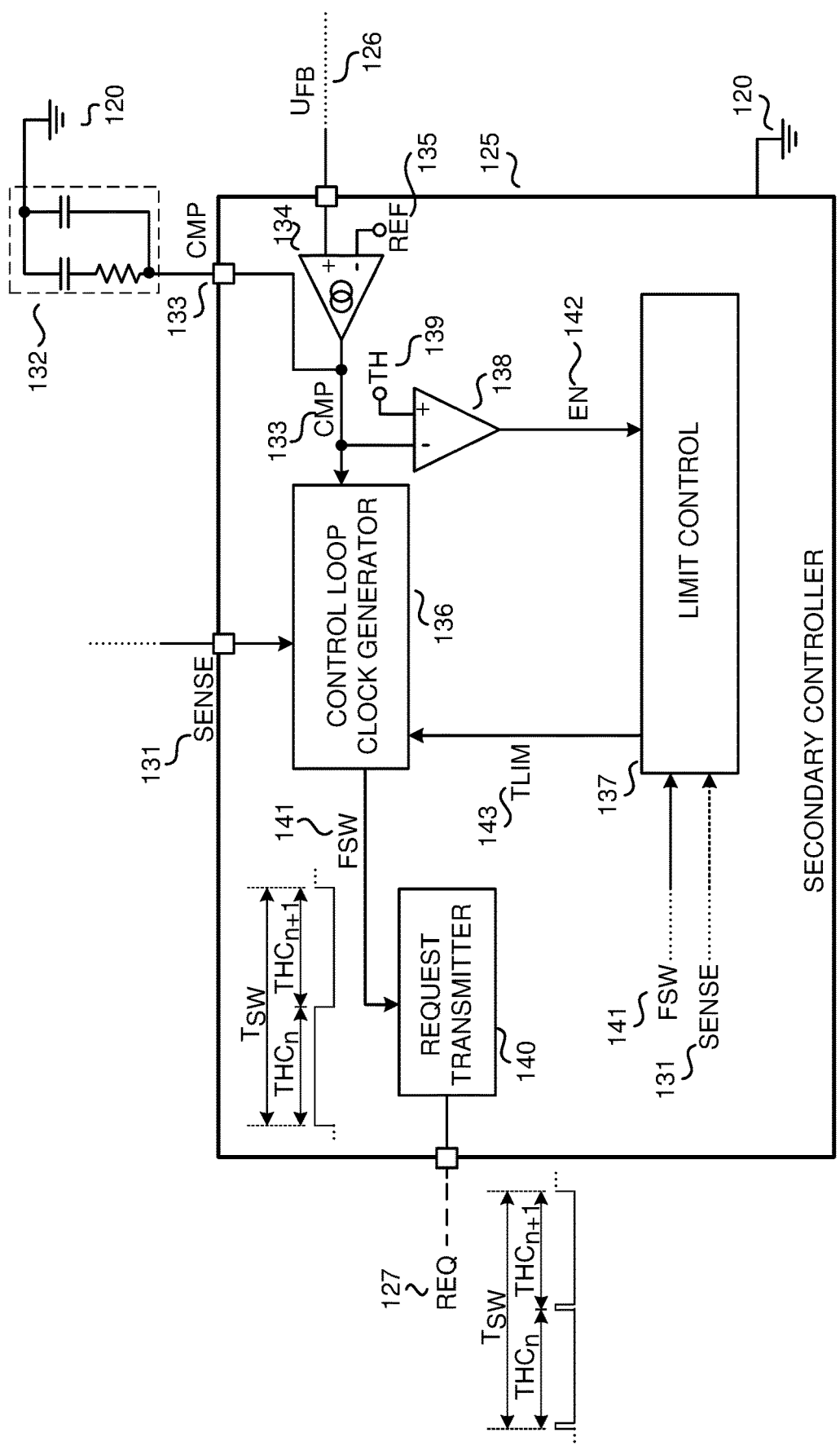
FIG. 1B is a functional block diagram of an example secondary controller with a limit control in accordance with the teachings of the present invention.

FIG. 1B illustrates another functional block diagram of one example secondary controller 125 in accordance with the teachings of the present invention. It is appreciated that secondary controller 125 of FIG. 1B shares many similarities with the example of secondary controller 125 of FIG. 1A, and that similarly named and numbered elements referenced below may be coupled and function similar to as described above. In the example of FIG. 1B, the secondary controller 125 includes a transconductance amplifier 134, control loop clock generator 136, comparator 138, limit control 137, and request transmitter 140. Transconductance amplifier 134 is coupled to receive the feedback signal $U_{FB}$ 126 and a feedback reference REF 135. The output of the transconductance amplifier 134 is the load signal CMP 133. In operation, the output of the transconductance amplifier 134 is a current responsive to the difference between the feedback signal $U_{FB}$ 126 and feedback reference REF 135. The greater the difference between the feedback signal $U_{FB}$ 126 and feedback reference REF 135, the larger the output current of the transconductance amplifier 134. The output of the transconductance amplifier 134 may be coupled to a compensation circuit 132, which is shown external to the secondary controller 125. In the example shown, the compensation circuit 132 is coupled to output return 120 and includes a resistor and capacitor coupled together in series along with a capacitor coupled in parallel to the series coupled resistor and capacitor. In the depicted example, the compensation circuit 132 provides loop compensation for the feedback loop of the power converter 100. Further, the compensation circuit 132 may alter the response time of the feedback loop of the power converter 100. With the compensation circuit 132, the load signal CMP 133 received by the control loop clock generator 136 may be a voltage signal. In one example, a larger value for the load signal CMP 133 corresponds to a smaller output load 123. In other words, the load signal CMP 133 increases as the load 123 decreases.

In the example shown, the control loop clock generator 136 receives the sense signal SENSE 131 and the load signal CMP 133 and outputs the switching frequency signal FSW 141 to the request transmitter 140. The switching frequency signal FSW 141 is representative of the switching frequency of the primary switches (S1 104 and S2 106) and may be a rectangular pulse waveform with logic high and logic low sections. The control loop clock generator 136 utilizes the sense signal SENSE 131 and the load signal CMP 133 to determine the lengths of the logic high and logic low sections. It should be appreciated that the sense signal SENSE 131 maybe optional, and the control loop clock generator 136 can include a voltage controlled oscillator (VCO) or other schemes which are responsive to the load signal CMP 133 to determine the lengths of the logic high and logic low sections.

For an LLC converter, the logic high and logic low sections are generally of equal length during steady state conditions. The time between consecutive leading edges, or the time between consecutive rising edges, for the switching frequency signal FSW 141 is referred to as the switching period $T_{SW}$. Or in other words, the sum of the length of the logic high section and the logic low section is the switching period $T_{SW}$ of the switching frequency signal FSW 141. The switching period $T_{SW}$ of the switching frequency signal FSW 141 is generally also the switching period for the high side switch S1 104 and the low side switch S2 106. However, there may be a period of time, referred to as "dead time," where both the high side switch S1 104 and the low side switch S2 106 are OFF prior to one of those switches turning ON to allow the voltage across that switch to reduce to zero, achieving ZVS. When dead time is utilized, the switching period for the high side switch S1 104 and the low side switch S2 106 is substantially the switching period $T_{SW}$ of the switching frequency signal FSW 141 plus the dead time after turning off the high side switch S1 104 and the dead time after turning off the low side switch S2 106.

Each switching period $T_{SW}$ for the switching frequency signal FSW 141 includes two half cycles, shown as half cycle $THC_n$ and $THC_{n+1}$. The switching frequency signal FSW 141 is logic high during one of these half cycles ($THC_n$) and logic low during the other half cycle ($THC_{n+1}$). In one example, the high side switch S1 104 is ON (i.e., the high side switch S1 104 may conduct current) when the switching frequency signal FSW 141 is logic high, while the low side switch S2 106 is ON (i.e., the low side switch S2 106 may conduct current) when the switching frequency signal FSW 141 is logic low. The switching period $T_{SW}$ and the lengths of the half cycles $THC_n$ and $THC_{n+1}$ are used to control the amount of energy delivered to the load 123. In one example, the longer the switching period $T_{SW}$ (i.e., the longer the half cycles $THC_n$ and $THC_{n+1}$), the more energy is delivered to the output of the power converter 100 and the load 123 due to the gain of the resonant tank 181.

Under steady state conditions, the two half cycles, shown as half cycle $THC_n$ and $THC_{n+1}$, are substantially equal. However, under transient conditions (e.g., a varying load, sudden changes in input voltage, etc.), the lengths of the two half cycles $THC_n$ and $THC_{n+1}$ are not equal, thereby varying the overall switching period $T_{SW}$, to bring the output of the power converter back into regulation. For the example of an increasing load, the two half cycles $THC_n$ and $THC_{n+1}$ and the overall switching period $T_{SW}$ will progressively increase to regulate the output of the power converter 100. When the limit control 137 is enabled, the limit control 137 controls the rate at which the half cycles $THC_n$ and $THC_{n+1}$ are allowed to increase. As will be further discussed, the control loop clock generator 136 receives the limit signal TLIM 143 from limit control 137. In one example, the limit signal TLIM 143 is representative of the maximum length of the current half cycle. The limit signal TLIM 143 may be a pulsed signal that pulses to a logic high value when the limit/maximum length of the current half cycle has elapsed. In response to the received pulse in the limit signal TLIM 143, the control loop clock generator 136 terminates the current half cycle by transitioning the switching frequency signal FSW 141 from logic high to logic low or vice versa.

The switching frequency signal FSW 141 is received by the request transmitter 140. The frequency of the request signal REQ 127 is responsive to the switching frequency or switching period set by the switching frequency signal FSW 141. In one example, at every leading and trailing edge of the switching frequency signal FSW 141, the request transmitter 140 outputs a pulse in the request signal REQ 127 to turn on either the high side switch S1 104 or the low side switch S2 106. In one example, a leading edge in the switching frequency FSW 141 corresponds to turning on the high side switch S1 104 and turning off the low side switch S2 106, while a trailing edge corresponds to turning on the low side switch S2 106 and turning off the high side switch S1 104. In other words, a logic high value of the switching frequency signal FSW 141 generally corresponds to the conduction time of the high side switch S1 104, while a logic low generally corresponds to the conduction time of the low side switch S2 106. It should be appreciated that there may also be dead time between turning off the high side switch S1 104 and turning on the low side switch S2 106 and vice versa. As shown, the time between every other leading edge, or every other trailing edge, is substantially the switching period $T_{SW}$. The time between consecutive leading edges, or consecutive trailing edges, is substantially the length of the half cycle, $THC_n$ or $THC_{n+1}$.

Comparator 138 is coupled to receive the load signal CMP 133 and the threshold TH 139. In one example, threshold TH 139 represents the load threshold for the power converter 100 for when maximum allowed power delivery, or other depletion of the tank current, may occur. In one example, the threshold TH 139 is received at the non-inverting input of comparator 138 while the load signal CMP 133 is received at the inverting input. The output of comparator 138 is the enable signal EN 142. The enable signal EN 142 may be a rectangular pulse waveform with varying lengths of logic high and logic low sections. In operation, the enable signal EN 142 may be logic high when the load signal CMP 133 falls below the threshold TH 139 indicating a high load, and thereby enables the operation of limit control 137.

Limit control 137 may be coupled to receive the enable signal 142 and the switching frequency signal FSW 141 and outputs the limit signal TLIM 143. Optionally, the limit control 137 may also receive the sense signal SENSE 131. In operation, limit control 137 may measure and store the lengths of the half cycles by monitoring either the switching frequency signal FSW 141 or the sense signal SENSE 131. When enabled, the limit control 137 determines the maximum length (i.e., the "limit") for the current half cycle $THC_n$ in response to the measured length of the previous half cycle $THC_{n-1}$. In one example, the limit or maximum length of the current half cycle $THC_n$ is not to exceed the length of the previous half cycle $THC_{n-1}$ by a fixed amount K in accordance with the teachings of the present invention.

Figure 1C:
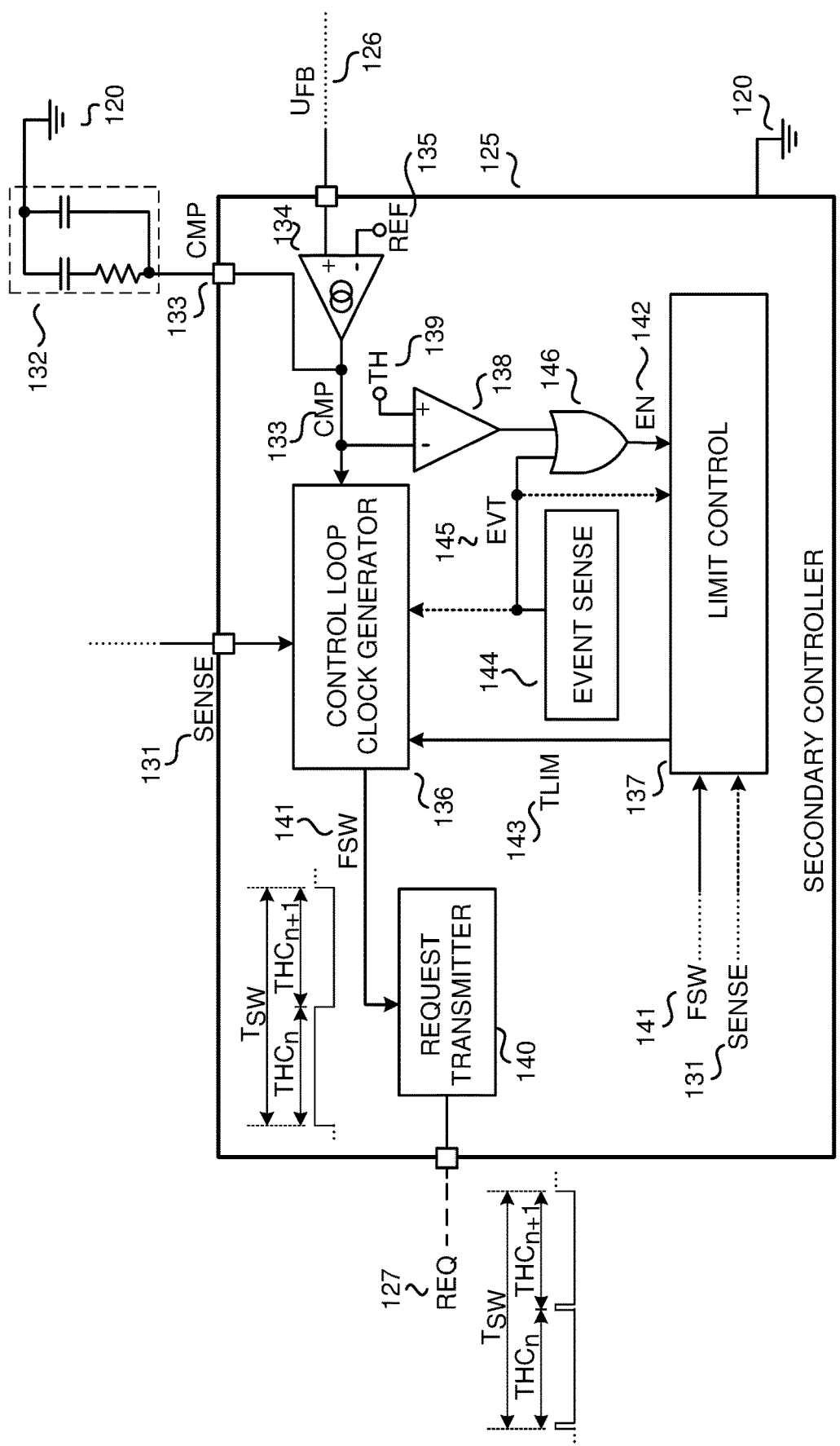
FIG. 1C is a functional block diagram of another example secondary controller with a limit control which also receives an event in accordance with the teachings of the present invention.

FIG. 1C illustrates another functional block diagram of another example secondary controller 125 in accordance with the teachings of the present invention. It is appreciated that secondary controller 125 of FIG. 1C shares many similarities with the example of secondary controller 125 of FIGS. 1A and 1B, and that similarly named and numbered elements referenced below may be coupled and function similar to as described above. In the example of FIG. 1C, the secondary controller 125 may further include an event sense circuit 144 and OR gate 146. In the depicted example, the event sense circuit 144 is coupled to output an event signal EVT 145 in response to detected events. In various examples, the event sense circuit 144 may detect when hard switching is occurring in the power converter from either indirect or direct methods.

As shown in the illustrated example, OR gate 146 is coupled to receive the output of comparator 138 and the event signal EVT 145 and output the enable signal EN 142. As such, the limit control 137 may be enabled by either the load signal 133 falling below the threshold TH 139 or by the event sense circuit 144 detecting an event. In one example, the event signal EVT 145 may also optionally be received by the control loop clock generator 136 and the limit control 137. In one example, the control loop clock generator 136 may terminate the current half cycle by transitioning the switching frequency signal FSW 141 from logic high to logic low or vice versa in response to event signal EVT 145 indicating that an event has been sensed. In one example, limit control 145 may optionally respond to the event signal EVT 145 indicating that a startup condition or an event has been sensed in one or more ways. For example, the limit control 145 may output a pulse in the limit signal TLIM 143 to terminate the current half cycle. In another example, the limit control 145 may limit the maximum length of the next half cycle to be a value less than the length of the current half cycle which results in an increase in switching frequency. This decrement value may be fixed or variable. In one example, the event sense 144 may monitor the conduction of rectifiers D1 117 and D2 118 to determine when the limit control 142 should be enabled. Sensing the conduction of rectifiers D1 117 and D2 118 could be accomplished by monitoring either the voltage or current of the first and second output windings 112 and 113. In one example, the event sense 144 may determine an event has been detected by sensing how quickly the rectifiers D1 117 and D2 118 start to conduct or sensing when the rectifiers D1 117 and D2 118 stop conducting.

Figure 2A:
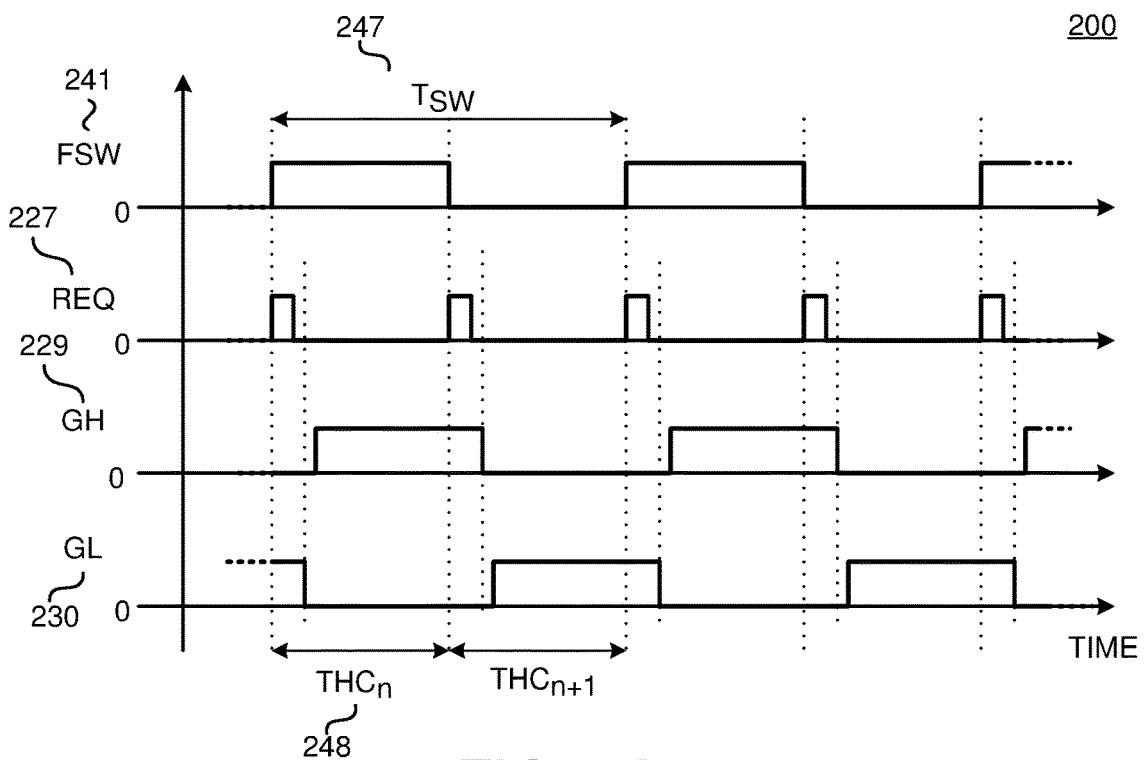
FIG. 2A illustrates a timing diagram with example waveforms for the switching frequency signal, request signal, high-side drive signal, and low-side drive signal in accordance with the teachings of the present invention.

FIG. 2A is a timing diagram 200 illustrating example waveforms of the switching frequency signal FSW 241, request signal REQ 227, first drive signal GH 229, and second drive signal GL 230. It is appreciated that switching frequency signal FSW 241, request signal REQ 227, first drive signal GH 229, and second drive signal GL 230 of FIG. 2A may be examples of switching frequency signal FSW 141, request signal REQ 127, first drive signal GH 129, and second drive signal GL 130 as described in previous examples, and that similarly named and numbered elements referenced below may be coupled and function similar to as described above. As shown in the example of FIG. 2A, the switching frequency signal FSW 241 is a rectangular pulse waveform of varying lengths of logic high and logic low sections. The switching period $T_{SW}$ 247 is shown as the time between leading edges of the switching frequency signal FSW 241, but it is appreciated that switching period $T_{SW}$ 247 may also be defined as the time between trailing edges. Switching period $T_{SW}$ 247 is substantially the inverse of the switching frequency. As shown, the switching period $T_{SW}$ 247 may comprise two half cycles with one half cycle $THC_n$ 248 corresponding to a logic high section and another half cycle $THC_{n+1}$ corresponding to the logic low section of the switching period $T_{SW}$ 247. Under steady state conditions, the length half cycle $THC_n$ 248 is substantially equal to the length to half cycle $THC_{n+1}$. During transient conditions, the half cycles may increase or decrease over time. When the limit control is enabled, the maximum length of the next half cycle $THC_{n+1}$ is limited to the length of the previous half cycle $THC_n$ 248 plus a fixed value K. Further, under certain circumstances, half cycle $THC_{n+1}$ may be limited to the length of the previous half cycle $THC_n$ minus a decrement value Z.

The request signal REQ 227 may be a rectangular pulse waveform with a logic high value at every leading and trailing edge of the switching frequency signal FSW 241. The request signal REQ 227 is then transmitted to the primary controller to control switching of the high side switch S1 and the low side switch S2 via the first drive signal GH 229 and the second drive signal GL 230, respectively. In one example, logic high sections of the switching frequency signal FSW 241 correspond to a conducting high side switch S1 and a logic high first drive signal GH 229, and logic low sections correspond to a conducting low side switch and a logic high second drive signal GL 230. For every leading edge of the switching frequency signal FSW 241, the request signal REQ 227 pulses to a logic high value. The second drive signal GL 230 transitions to a logic low value to turn OFF the low side switch S2 prior to the first drive signal GH 229 transitioning to the logic high value to turn ON the high side switch S1.

As shown, there is a propagation delay between the pulse of the request signal REQ 227 and the logic low transition of the second drive signal GL 230, or the logic low transition of the first drive signal GH 229 in the next half cycle, which is representative of the time to transmit from the secondary controller to the primary controller and the delays of the various circuits within both. Further, FIG. 2A also illustrates the dead time between turning OFF the low side switch S2 (i.e., trailing edge of GL 230) and turning ON the high side switch S1 (i.e., leading edge of GH 229) and vice versa. The first drive signal GH 229 transitions to the logic low value to turn OFF the high side switch S1 prior to the second drive signal transitioning to the logic high value to turn ON the low side switch S2. Similarly, the second drive signal GL 230 transitions to the logic low value to turn OFF the low side switch S2 prior to the first drive signal transitioning to the logic high value to turn ON the high side switch S1. As mentioned above, if there is non-zero tank current, ZVS may occur.

Figure 2B:
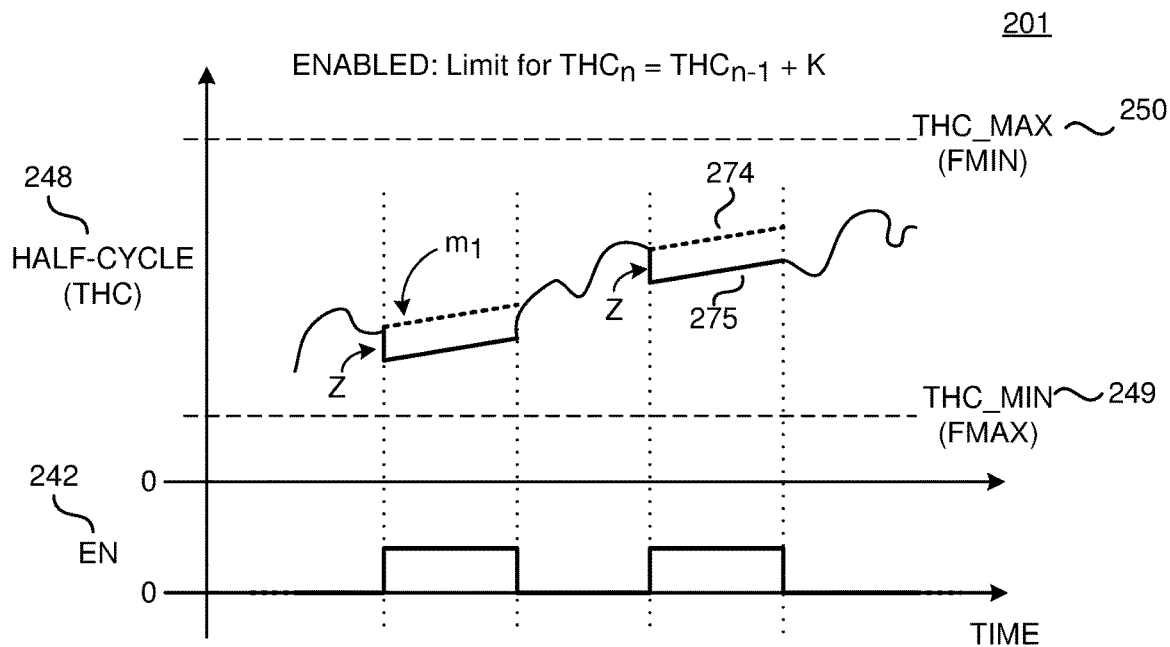
FIG. 2B illustrates a timing diagram with example waveforms for the half-cycle and enable signal in accordance with the teachings of the present invention.

FIG. 2B is a timing diagram 201 which illustrates the length of a half cycle THC 248 and how it may respond to the enable signal EN 242. It is appreciated that half cycle THC 248 and enable signal EN 242 of FIG. 2B may be examples of half cycle THC and enable signal EN as described in previous examples, and that similarly named and numbered elements referenced below may be coupled and function similar to as described above. As shown in FIG. 2B, the length of the half cycle THC 248 is controlled to be greater than or equal to a minimum half cycle THC_MIN 249, which is related to the maximum switching frequency FMAX of the power converter. Further, the length of the half cycle THC 248 is controlled to be less than or equal to the maximum half cycle THC_MAX 250, which is related to the minimum switching frequency FMIN of the power converter. In one example, the power converter is delivering the most energy to its output when operating at the minimum switching frequency FMIN and delivering the least energy when operating at its maximum switching frequency FMAX.

When the enable signal EN 242 is not asserted (i.e., logic low), the lengths of the half cycle THC 248 may vary in response to the sense signal and/or feedback signal as otherwise determined by the control loop clock generator within the frequency limits of FMIN and FMAX. As such, the half cycle THC 248 is shown as a haphazard squiggly line in FIG. 2B. However, when the enable signal EN 242 is asserted (i.e., logic high), the increase of the length of the half cycle THC 248 is controlled to slope ml as shown. In other words, the maximum length of the next half cycle is limited to the sum of the length of the previous half cycle and a fixed value K. FIG. 2B also illustrates a dashed line 274 and solid line 275. For the dashed line 274, the increase of the length of the half cycle THC 248 is controlled to slope ml with the initial value for the half cycle THC 248 substantially equal to the value of the half cycle THC 248 at the leading edge of the enable signal EN 242. For the solid line 275, the increase of the length of the half cycle THC 248 is controlled to slope ml with the initial value for the half cycle THC 248 substantially equal to the value of the half cycle THC 248 at the leading edge of the enable signal EN 242 minus a decrement value Z. Although a fixed value K and linear slope ml is shown, it should be appreciated that a non-linear slope could be used to control the increase of the half cycle THC 248. In one example the system could be configured for fast attack (Z), to allow quick response to events. Likewise in one example the system could be configured for the slow decay (K and slope ml), to allow the limit control to blend gently and hand back control to the main control loop.

Figure 2C:
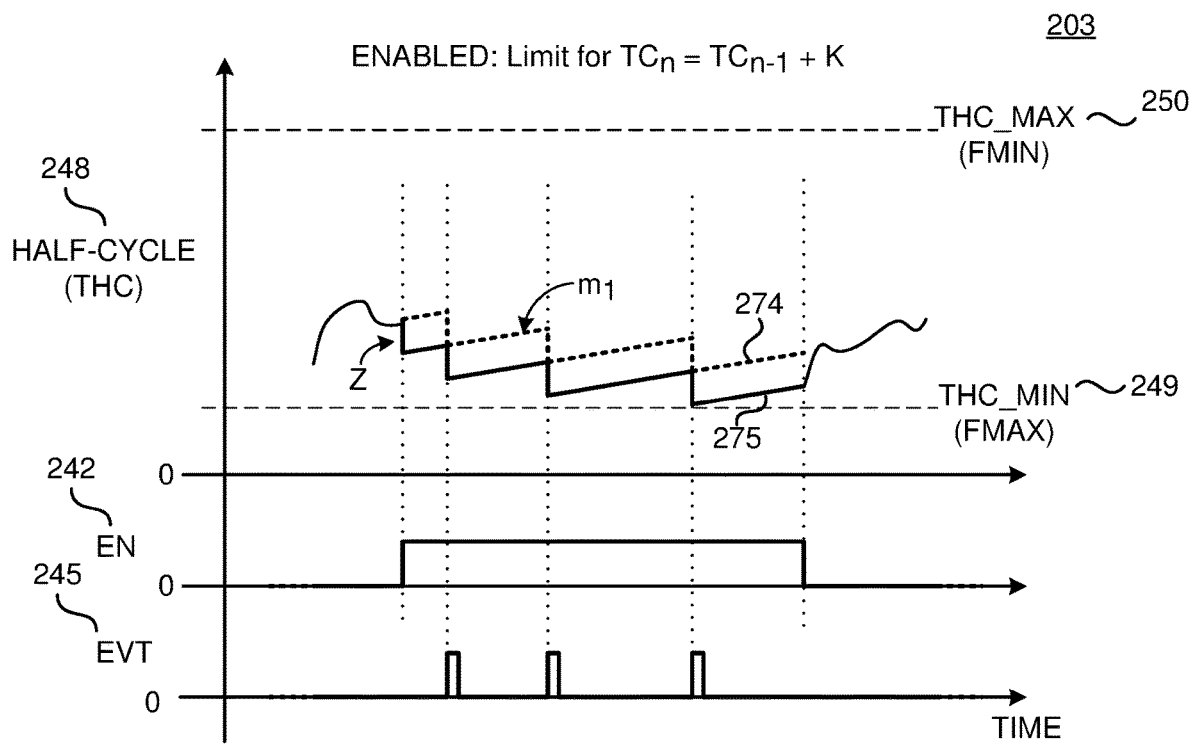
FIG. 2C illustrates a timing diagram with example waveforms for the half-cycle, enable signal, and event signal in accordance with the teachings of the present invention.

FIG. 2C is a timing diagram 203 which illustrates the length of a half cycle THC 248 and how it may respond to the enable signal EN 242 and an event signal EVT 245. It is appreciated that half cycle THC 248, the enable signal EN 242, and event signal EVT 245 of FIG. 2C may be examples of half cycle THC, enable signal EN, and event signal EVT as described in previous examples, and that similarly named and numbered elements referenced below may be coupled and function similar to as described above. As shown in FIG. 2C, the length of the half cycle THC 248 is controlled to be greater than or equal to a minimum half cycle THC_MIN 249, which is related to the maximum switching frequency FMAX of the power converter. Further, the length of the half cycle THC 248 is controlled to be less than or equal to the maximum half cycle THC_MAX 250, which is related to the minimum switching frequency FMIN of the power converter.

When the enable signal EN 242 is not asserted (i.e., logic low), the lengths of the half cycle THC 248 may vary in response to the sense signal and/or feedback signal as otherwise determined by the control loop clock generator within the frequency limits of FMIN and FMAX. As such, the half cycle THC 248 is shown as a haphazard squiggly line in FIG. 2C. However, when the enable signal EN 242 is asserted (i.e., in one example, logic high), the increase of the length of the half cycle THC 248 is controlled to slope ml. In other words, the maximum length of the next half cycle is limited to the sum of the length of the previous half cycle and a fixed value K.

The event signal EVT 245 is a pulsed signal and in one example, pulses to a logic high value when starting up the power supply or when an event has been detected. For every pulse in the event signal EVT 245, the maximum length of the half cycle THC 248 is decremented. In other words, the maximum length of the half cycle THC 248 is substantially equal to the value of the half cycle THC 248 at the pulse of the event signal EVT 245 minus a decrement value Z.

FIG. 2C also illustrates a dashed line 274 and solid line 275. For the dashed line 274, the increase of the length of the half cycle THC 248 is controlled to slope ml with the initial value for the half cycle THC 248 substantially equal to the value of the half cycle THC 248 at the leading edge of the enable signal EN 242. For the solid line 275, the increase of the length of the half cycle THC 248 is controlled to slope ml with the initial value for the half cycle THC 248 substantially equal to the value of the half cycle THC 248 at the leading edge of the enable signal EN 242 minus a decrement value Z. Although a fixed value K and linear slope ml is shown, it should be appreciated that a non-linear slope could be used to control the increase of the half cycle THC 248. In one example, the decrement of the half cycle THC 248 may allow for a quick response by the controller to detected events and/or enabling of the limit control. The controlled increase of the length of the half cycle THC 248 may allow the limit control to gently increase power delivery and hand back control to the control loop clock generator without discontinuities.

Figure 2D:
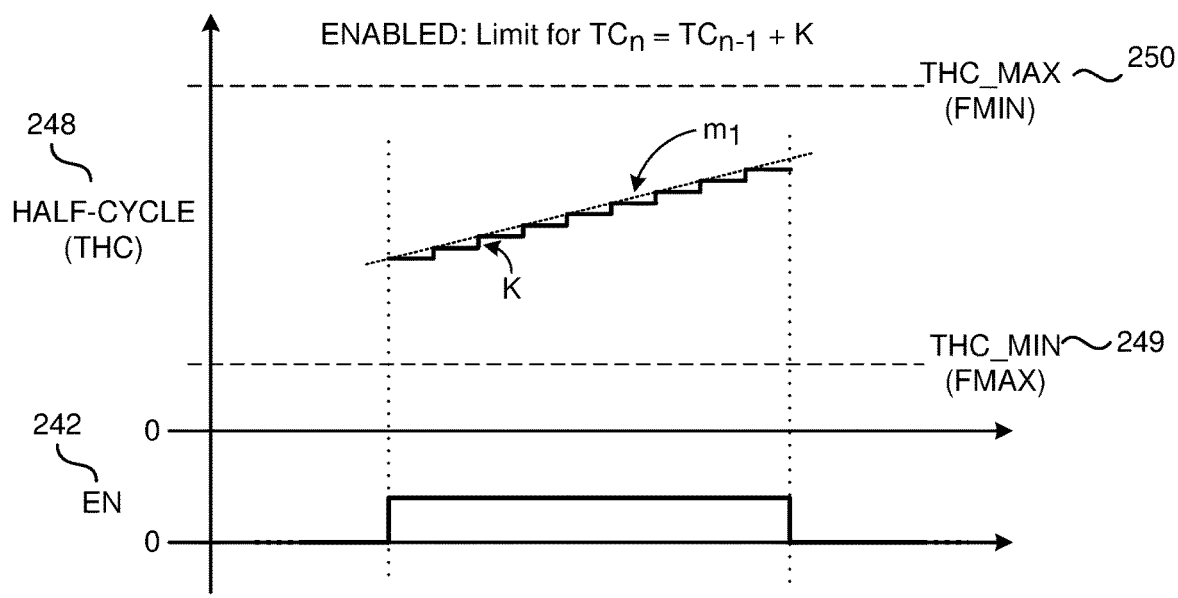
FIG. 2D illustrates a timing diagram with further example waveforms for the half-cycle and enable signal in accordance with the teachings of the present invention.

FIG. 2D is a timing diagram 205 which illustrates the length of a half cycle THC 248 and how it may respond to the enable signal EN 242. It is appreciated that half cycle THC 248 and enable signal EN 242 of FIG. 2D may be examples of half cycle THC and enable signal EN as described in previous examples, and that similarly named and numbered elements referenced below may be coupled and function similar to as described above. Further, it is appreciated that FIG. 2D is similar to the example shown in FIG. 2B, with at least one difference being that the increase of the maximum length of the half cycle THC 248 is incremented in steps. As shown in FIG. 2D, the steps of the maximum length of the half cycle THC 248 are incremented in steps of a fixed value K. As shown in the depicted example, the effective slope of the step increase is substantially the slope m1. Although a fixed value K and linear slope m1 is shown, it should be appreciated that a non-linear slope could be used to control the increase of the half cycle THC 248.

Figure 3A:
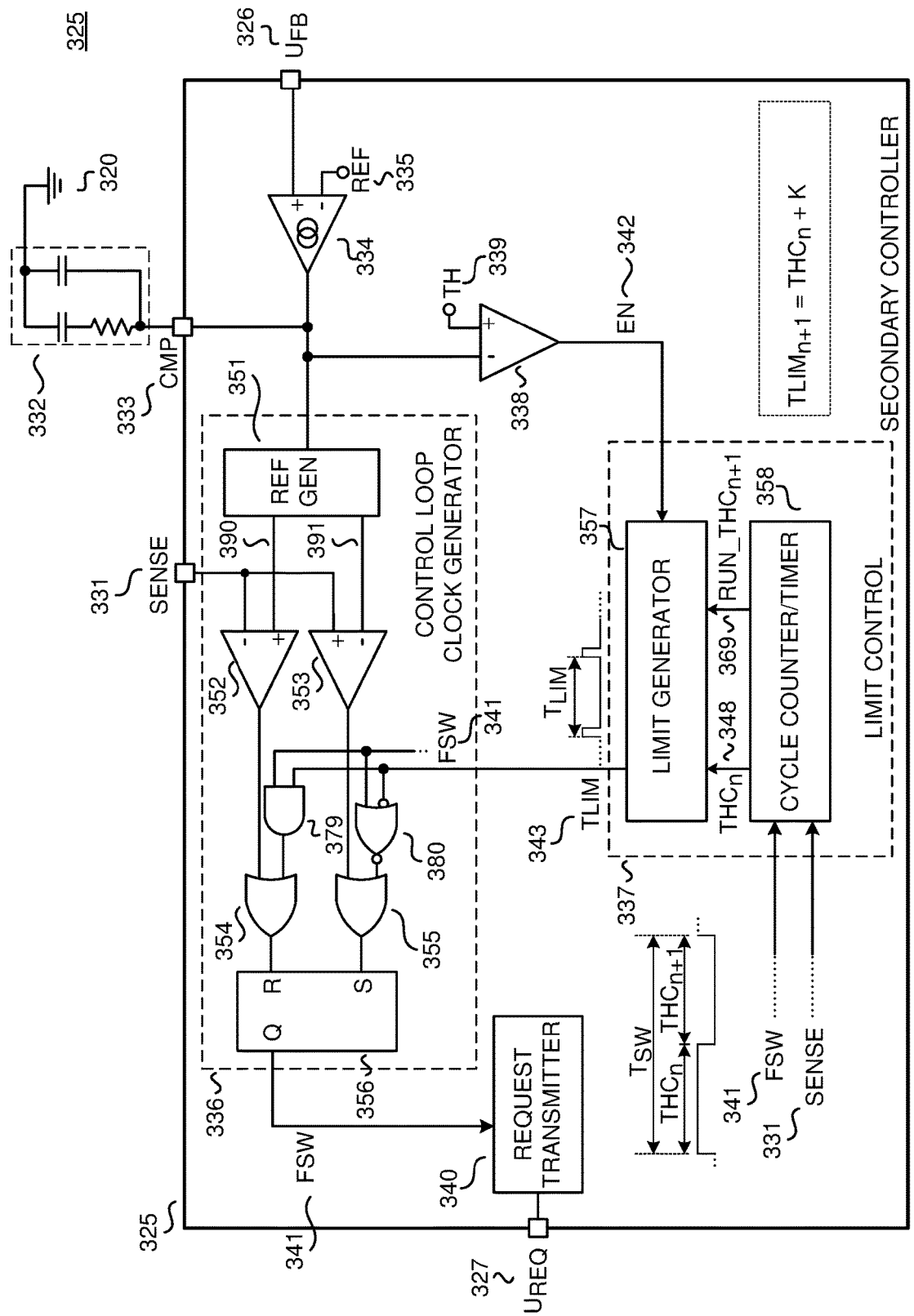
FIG. 3A illustrates an example functional block diagram of the secondary controller with limit control of FIG. 1B in accordance with the teachings of the present invention.

FIG. 3A illustrates one example of the secondary controller 325 with limit control 337. It is appreciated that secondary controller 325 of FIG. 3A may be another example of secondary controller 125 of FIGS. 1A and 1B, and that similarly named and numbered elements referenced below may be coupled and function similar to as described above. In the example of FIG. 3A, the secondary controller 325 includes a transconductance amplifier 334, control loop clock generator 336, comparator 338, limit control 337, and request transmitter 340. Transconductance amplifier 334 is coupled to receive the feedback signal $U_{FB}$ 326 and a feedback reference REF 335 and outputs the load signal CMP 333. The output of the transconductance amplifier 334 may be coupled to a compensation circuit 332, which may provide loop compensation for the feedback loop of the power converter. In one example, a larger value for the load signal CMP 333 corresponds to a smaller load. In other words, the load signal CMP 333 increases as the load decreases.

As shown in FIG. 3A, the control loop clock generator 336 may include a reference generator 351, comparators 352 and 353, OR gates 354 and 355, latch 356, AND gate 379, and NOR gate 380. Reference generator 351 may be coupled to receive the load signal CMP 333 and generate first 390 and second 391 references for comparators 352 and 353, respectively. The first reference 390, may substantially follow the value of the load signal CMP 333. The second reference 391 may be a complementary version of the first reference 390, whereby the magnitude of the first reference 390 above a common-mode value is equal and opposite for the second reference 391, with respect to the same common-mode value. Thus two references are created, one which substantially follows the load signal CMP 333 and the other with a complementary reference as described. The two references may move in opposite directions with respect to the load. The first reference 390 may generally reduce in value with increasing load. The second reference 391 (the complementary reference) may therefore generally increase in value with respect to increasing load.

Comparator 353 may be coupled to receive the second reference 391 from the reference generator 351 at its inverting input and the sense signal SENSE 331 at its non-inverting input. Comparator 352 is coupled to receive the first reference 390 from the reference generator 351 at its non-inverting input and the sense signal SENSE 331 at its inverting input.

AND gate 379 may coupled to receive the switching frequency signal FSW 341 and the limit signal TLIM 343 from the limit control 337. OR gate 354 may be coupled to receive the output of comparator 353 and the output of AND gate 379. NOR gate 380 may be coupled to receive the switching frequency signal FSW 341 and the inverted limit signal TLIM 343 from the limit control 337, as shown by the circle at one of the inputs of NOR gate 380. The OR gate 355 may be coupled to receive the output of comparator 353 and the output of NOR gate 380. Latch 356 may receive the outputs of OR gates 354 and 355. In the example shown, the latch 356 receives the output of OR gate 355 at its set S input and receives the output of OR gate 354 at its reset R input. The output of the latch 356 may be the switching frequency signal FSW 341. In operation for the example shown, the latch 356 is set, and the switching frequency signal FSW 341 transitions to a logic high value, when the sense signal SENSE 331 is greater than the reference provided by the reference generator 351 or when the limit signal TLIM 343 is asserted while the switching frequency FSW 341 is logic low (i.e., the half cycle limit determined by the limit control 337 has been reached). The latch 356 is reset, and the switching frequency signal FSW 341 transitions to a logic low value, when the sense signal SENSE 331 falls below the reference provided by the reference generator 351 or when the limit signal TLIM 343 is asserted while the switching frequency signal FSW is logic high (i.e., the half cycle limit determined by the limit control 337 has been reached). By varying the values of the references 390, 391 output by the reference generator 351 in response to the load signal CMP 333, the control loop clock generator 356 controls the switching frequency and switching period of the high side and low side switches and the amount of energy delivered to the output of the power converter.

Each switching period $T_{SW}$ for the switching frequency signal FSW 341 includes two half cycles, shown as half cycle $THC_n$ and $THC_{n+1}$. The switching frequency signal FSW 341 may be logic high during one of these half cycles (i.e., $THC_n$) and logic low during the other half cycle (i.e., $THC_{n+1}$). The switching period $T_{SW}$ and the lengths of the half cycles $THC_n$ and $THC_{n+1}$ are used to control the amount of energy delivered to the load. The longer the switching period $T_{SW}$ (i.e., the longer the half cycles $THC_n$ and $THC_{n+1}$), the more energy is delivered to the output of the power converter and the load. Under steady state conditions, the two half cycles $THC_n$ and $THC_{n+1}$ are generally substantially equal. However, under transient conditions, the lengths of the two half cycles $THC_n$ and $THC_{n+1}$ may be varied, which therefore varies the overall switching period $T_{SW}$, to bring the output of the power converter back into regulation.

When the limit control 337 is enabled via enable signal EN 342, the limit control 337 controls the rate at which the half cycles $THC_n$ and $THC_{n+1}$ can change. In particular, the limit control 337 controls the rate at which the half cycles $THC_n$ and $THC_{n+1}$ can increase. The control loop clock generator 336 receives the limit signal TLIM 343 representative of the maximum length of the current half cycle. The limit signal TLIM 343 may be a pulsed signal that may pulse to a logic high value when the limit/maximum length of the current half cycle has elapsed. In response to the received pulse in the limit signal TLIM 343, the control loop clock generator 336 terminates the current half cycle via OR gates 354 and 355, latch 356, AND gate 379, and NOR gate 380 in accordance with the teachings of the present invention. For the example shown, if a pulse occurs in the limit signal TLIM 343 while the switching frequency signal FSW 341 is logic high, the latch 356 is reset and the switching frequency signal FSW 341 transitions to a logic low value and the current half cycle is terminated. If a pulse occurs in the limit signal TLIM 343 while the switching frequency signal FSW 341 is logic low, the latch 356 is set and the switching frequency signal FSW 341 transitions to a logic high value and the current half cycle is terminated. Limit control 337 may control the length of the half cycles $THC_n$ and $THC_{n+1}$ to be greater than or equal to a minimum half cycle THC_MIN (as shown in FIG. 2B), which is related to the maximum switching frequency FMAX of the power converter. Further, limit control 337 controls the length of the half cycles $THC_n$ and $THC_{n+1}$ to be less than or equal to the maximum half cycle THC_MAX (as shown in FIG. 2B), which is related to the minimum switching frequency FMIN of the power converter.

As shown in the depicted example, the switching frequency signal FSW 341 is received by the request transmitter 340. The frequency of the request signal REQ 327 is responsive to the switching frequency/period set by the switching frequency signal FSW 341. In one example, a leading edge in the switching frequency FSW 341 corresponds to turning on the high side switch S1, while a trailing edge in the switching frequency FSW 341 corresponds to turning on the low side switch S2.

Comparator 338 may be coupled to receive the load signal CMP 333 and the threshold TH 339. In one example, threshold TH 339 represents the load threshold for the power converter at maximum power delivery (where depletion of the tank current, may occur). As shown, the threshold TH 339 is received at the non-inverting input of comparator 338, the load signal CMP 333 is received at the inverting input of comparator 338, and the output of comparator 338 is the enable signal EN 342. In operation of the example shown, the enable signal EN 342 is logic high when the load signal CMP 333 falls below the threshold TH 339 and is coupled to enable the operation of limit control 337.

Limit control 337 may include a cycle counter/timer 358 and a limit generator 357. In the example shown, cycle counter/timer 358 is a timer coupled to receive the switching frequency signal FSW 341 and outputs a measured length or count of a half cycle. As shown, the cycle counter/timer 358 outputs the stored measured length of the previous half cycle $THC_n$ 348 and the running (or instantaneous) length of the current half cycle $RUN\_THC_{n+1}$ 369. In operation of the example, the cycle counter/timer 358 utilizes the switching frequency signal FSW 341 to measure and store the lengths of half cycles of the switching frequency signal FSW 341. In one example, the cycle counter/timer 358 is a timer that outputs the measured count value of the previous half cycle $THC_n$ 348 and the running count value of the current half cycle $RUN\_THC_{n+1}$ 369. Optionally, the cycle counter/timer 358 is coupled to receive the sense signal SENSE 331 and utilizes the sense signal to indirectly determine the lengths of half cycles of the switching frequency signal FSW 341.

The limit generator 357 may be coupled to receive the measured half cycle THC 348 and the enable signal EN 342 and outputs the limit signal TLIM 343. In one example, the limit generator 357 receives the measured value of the previous half cycle and the running value of the current half cycle. When enabled, limit generator 357 determines the maximum length (i.e., "limit") for the current half cycle $THC_{n+1}$ in response to the measured length of the previous half cycle $THC_n$. In one example, the limit/maximum length of the current half cycle $THC_{n+1}$ is not to exceed the length of the previous half cycle $THC_n$ by a fixed amount K. In one example, the limit signal TLIM 343 is a pulsed waveform that pulses to a logic high value when the calculated maximum limit for the current half cycle has been reached.

Figure 3B:
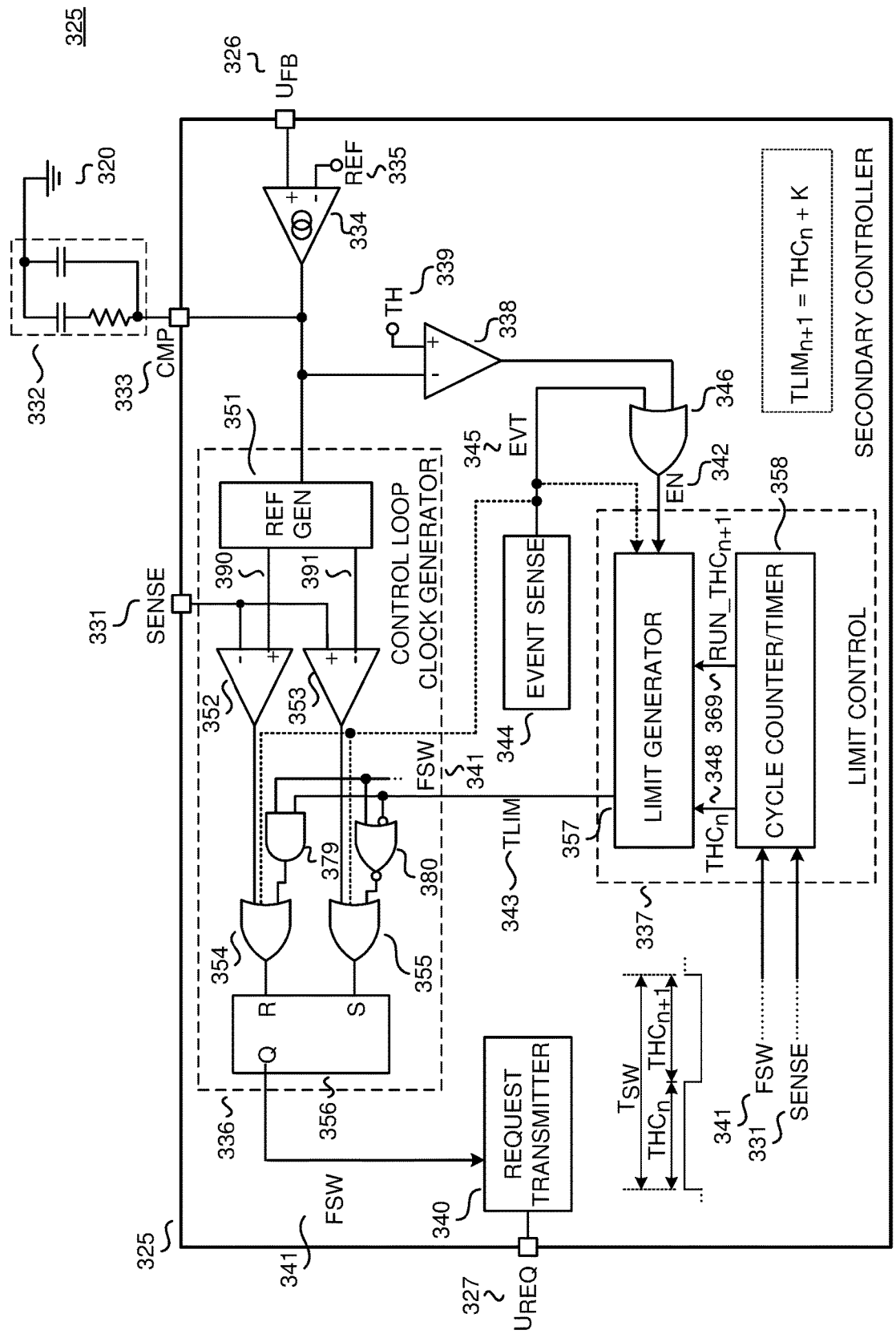
FIG. 3B illustrates another example functional block diagram of the secondary controller with limit control of FIG. 1C in accordance with the teachings of the present invention.

FIG. 3B illustrates another example secondary controller 325 in accordance with the teachings of the present invention. It is appreciated that secondary controller 325 of FIG. 3B may be another example of secondary controller 125 of FIGS. 1A and 1C, and that similarly named and numbered elements referenced below may be coupled and function similar to as described above. It is appreciated that secondary controller 325 of FIG. 3B shares similarities with the secondary controller 325 shown in FIG. 3A. At least one difference is the addition of the event sense circuit 344 and OR gate 346 in the secondary controller 325 of FIG. 3B. As shown in the depicted example, the event sense circuit 344 is coupled to output an event signal EVT 345 in response to detected events (typically an abnormal event). For example, the event sense circuit 344 may detect when the output capacitor CO needs rapid charging, such as a startup condition, or when hard switching is occurring in the power converter from either indirect or direct methods.

OR gate 346 is coupled to receive the output of comparator 338 and the event signal EVT 345 and outputs the enable signal EN 342. As such, the limit control 337 may be enabled by either the load signal 333 falling below the threshold TH 339 or by the event sense circuit 344 detecting an abnormal event. As shown, the event signal EVT 345 may also optionally be received by the control loop clock generator 336 and the limit generator 357 of limit control 337. In the example shown, the control loop clock generator 336 receives one or more event signals EVT 345 at OR gates 354 and 355. In operation, the control loop clock generator 336 may terminate the current half cycle, by setting or resetting the latch 356 via OR gates 354 or 355 to transition the value of the switching frequency signal FSW 341, in response to one or more event signals EVT 345 indicating that an event has been sensed. Limit control 337 may optionally respond to the event signal EVT 345 indicating that an event has been sensed in one or more ways. For example, the limit control 337 may output a pulse in the limit signal TLIM 343 to terminate the current half cycle. In another example, the limit control 337 may limit the maximum length of the next half cycle or the next sequence of half cycles to be a decrement value Z less than the length of the current half cycle. This decrement value Z may be fixed or variable.

Figure 3C:
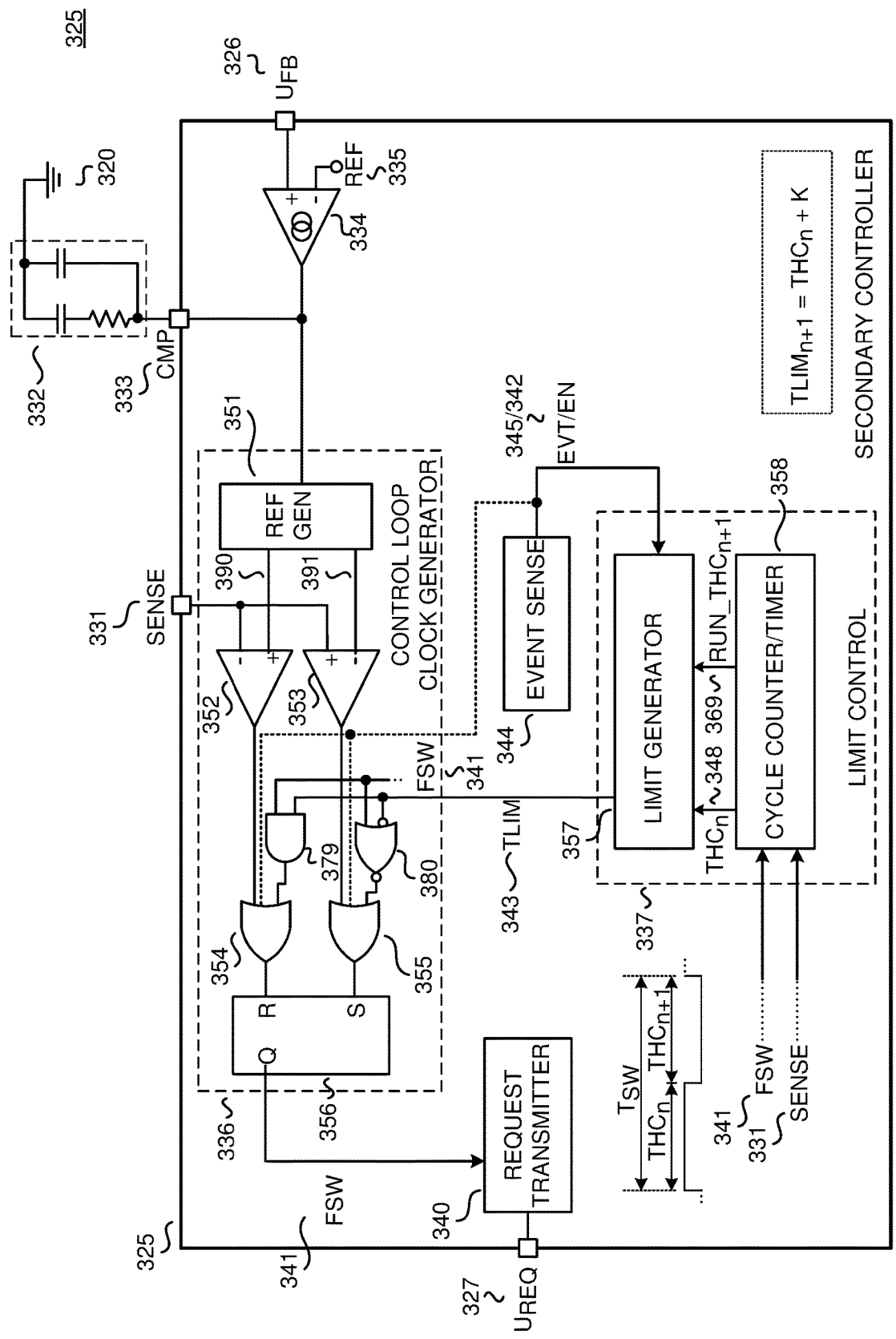
FIG. 3C illustrates a further example functional block diagram of the secondary controller with limit control in accordance with the teachings of the present invention.

FIG. 3C illustrates another example secondary controller 325 in accordance with the teachings of the present invention. It is appreciated that secondary controller 325 of FIG. 3C may be another example of secondary controller 125 of FIGS. 1A and 1C, and that similarly named and numbered elements referenced below may be coupled and function similar to as described above. It is appreciated that secondary controller 325 of FIG. 3C shares similarities with the secondary controller 325 shown in FIG. 3B. At least one difference is the absence of the comparator 338 and OR gate 346 shown in FIG. 3B. As shown in the depicted example, the event sense circuit 344 is coupled to output an event signal EVT 345 in response to detected events (typically an abnormal event). For example, the event sense circuit 344 may detect when the output capacitor CO needs rapid charging (startup) or when hard switching is occurring in the power converter from either indirect or direct methods. Further, the event signal EVT 345 may be utilized as the enable signal 342 for limit control 337. As such, the limit control 337 may be enabled by the event sense circuit 344 detecting an event. As shown, the event signal EVT 345 may also optionally be received by the control loop clock generator 336. In the example shown, the control loop clock generator 336 receives one or more event signals EVT 345 at OR gates 354 and 355. In operation, the control loop clock generator 336 may terminate the current half cycle, by setting or resetting the latch 356 via OR gates 354 or 355 to transition the value of the switching frequency signal FSW 341, in response to one or more event signals EVT 345 indicating that an event has been sensed. Limit control 337 may optionally respond to the event signal EVT 345 indicating that an event has been sensed in one or more ways. For example, the limit control 337 may output a pulse in the limit signal TLIM 343 to terminate the current half cycle. In another example, the limit control 337 may limit the maximum length of the next half cycle or sequence of subsequent half cycles to be a decrement value Z less than the length of the current half cycle. This decrement value Z may be fixed or variable. The limit control 337 may also limit the maximum length of the next half cycle or sequence of subsequent half cycles to be the length of the current half cycle plus the increment value K.

Figure 3D:
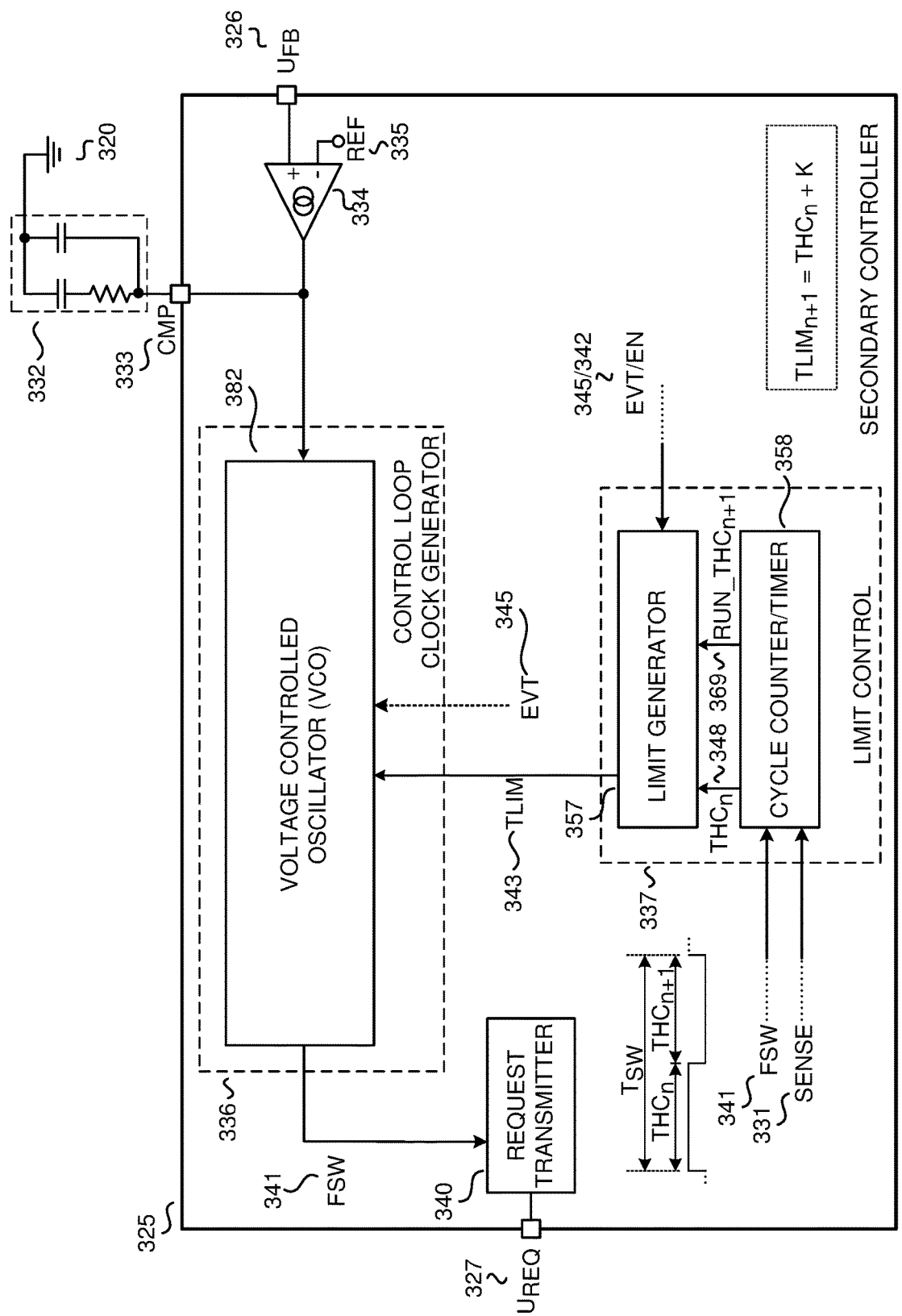
FIG. 3D illustrates another example functional block diagram of the secondary controller with limit control in accordance with the teachings of the present invention.

FIG. 3D illustrates another example secondary controller 325 in accordance with the teachings of the present invention. It is appreciated that secondary controller 325 of FIG. 3D may be another example of secondary controller 125 of FIGS. 1A, 1B, and 1C and that similarly named and numbered elements referenced below may be coupled and function similar to as described above. It is appreciated that secondary controller 325 of FIG. 3D shares similarities with the secondary controller 325 shown in FIGS. 3A, 3B, and 3C. At least one difference is that the control loop clock generator 336 includes a voltage controlled oscillator (VCO) 382 and does not receive the sense signal SENSE. The VCO 382 is coupled to receive the load signal CMP 333 and outputs the switching frequency signal FSW 341. The VCO 382 determines the switching period and switching frequency of the switching frequency signal FSW 341 in response to the load signal CMP 333. In other words, the VCO 382 may determine the lengths of the half cycles of the switching frequency signal FSW 341 in response to the value of the load signal CMP 333. In one example, as load increases, the value of the load signal CMP 333 decreases. The VCO 382 may decrease the switching frequency (and ergo increase the switching period and the lengths of the half cycles) of the switching frequency signal FSW 341 with increasing load (i.e. decreasing load signal CMP 333).

The VCO 382 is also coupled to receive the limit signal TLIM 343 representative of the maximum length of the current half cycle from the limit control 337. The limit signal TLIM 343 may be a pulsed signal that may pulse to a logic high value when the limit/maximum length of the current half cycle has elapsed. In response to the received pulse in the limit signal TLIM 343, the VCO 332 terminates the current half cycle. Optionally, the VCO 382 may be coupled to receive the event signal EVT 345, representative of a detected event. In response to a detected event, the VCO 382 may terminate the current half cycle. Alternatively, the limit signal TLIM 343 may be a voltage signal where the value of the voltage determines the length of the half cycle. For this example, the VCO 382 may receive the voltage from the limit signal TLIM 343 and add the voltage to the load signal CMP 333. A greater voltage could increase the switching frequency and reduce the power delivery.

Figure 4:
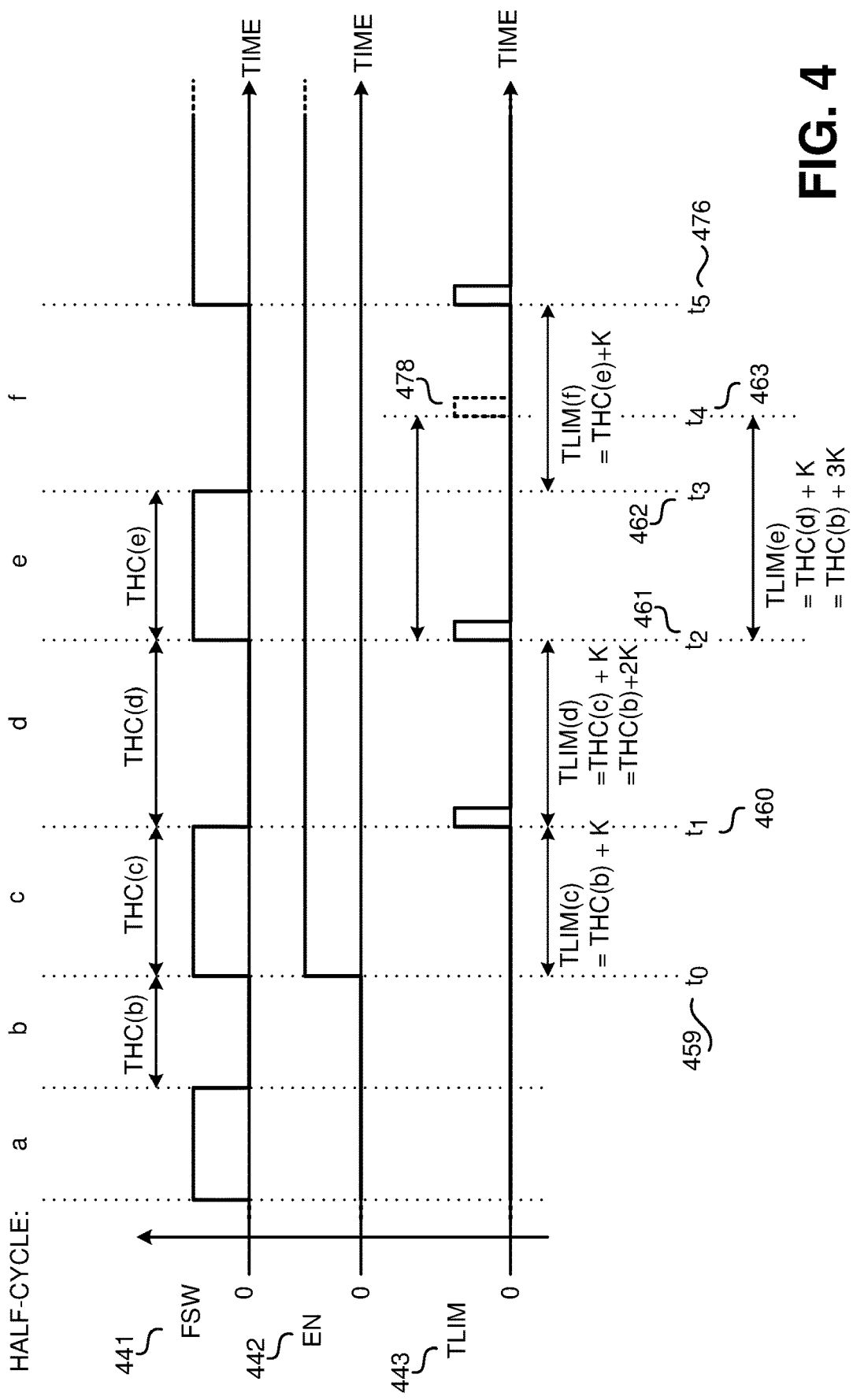
FIG. 4 illustrates a timing diagram illustrating an example implementation of the limit control in accordance with the teachings of the present invention.

FIG. 4 illustrates a timing diagram 400 of example waveforms of the switching frequency signal FSW 441, the enable signal EN 442, and the limit signal TLIM 443. It is appreciated that the switching frequency signal FSW 441, the enable signal EN 442, and the limit signal 443 of FIG. 4 may be examples of the switching frequency signal FSW, enable signal EN, and the limit signal TLIM as described in previous examples, and that similarly named and numbered elements referenced below may be coupled and function similar to as described above. As shown in the example of FIG. 4, the switching frequency signal FSW 441 is a rectangular pulse waveform. For the example shown, the limiter function utilizes a fixed limit of K, however as mentioned above, variable values for K and time changing values for K could also be utilized with embodiments of the present invention.

During half cycle a, the switching frequency signal FSW 441 may be logic high while both the enable signal EN 442 and limit signal TLIM 443 are logic low.

For half cycle b, the switching frequency signal FSW 441, enable signal EN 442 and limit signal TLIM 443 are logic low. The measured length of half cycle b in the depicted example is shown as:

$$THC(b). \quad (1)$$

At half cycle c, the switching frequency signal FSW 441 may be controlled such that the half cycles are increased. However, the enable signal EN 442 transitions to a logic high value at time t0 459 during half cycle c. At this time, the limit control has been enabled and the maximum length of half cycle c may be substantially the sum of the measured length of half cycle b THC(b) and the increment value K, or mathematically:

$$THC(c) \leq THC(b) + K. \quad (2)$$

At time t1 460, the limit for half cycle c (i.e., THC(b)+K) may have elapsed, the limit signal TLIM 443 pulses to a logic high value, which then resets the switching frequency FSW 441. As shown, at time t1 460 the switching frequency FSW 441 transitions to a logic low value as half cycle c has ended. The measured length of half cycle c in the depicted example is shown as:

$$THC(c) = THC(b) + K. \quad (3)$$

For half cycle d, the switching frequency signal FSW 441 may be logic low, and the enable signal EN 442 has remained at the logic high value. The maximum length (i.e., limit) for half cycle d, THC(d), may be substantially the sum of the measured length of half cycle c, THC(c), and the increment value K, or mathematically:

$$THC(d) \leq THC(c) + K. \quad (4)$$

For the example shown, the length of half cycle d, THC(d), is substantially equal to THC(c)+K. In addition, as summarized above, the measured length of half cycle c in the depicted example is shown as THC(c)=THC(b)+K. Therefore, substituting for THC(c), the maximum length of half cycle d THC(d) may also be expressed as:

$$THC(d) \leq (THC(b) + K) + K, \quad (5)$$

$$THC(d) \leq THC(b) + 2K. \quad (6)$$

In other words, the maximum length of half cycle d, THC(d), may also be expressed as the sum of the measured half cycle for cycle b, THC(b), plus twice the increment value K in the depicted example. At time t2 461, the maximum length (i.e., limit) for half cycle d (i.e., THC(d)≤THC(c)+K, or THC(d)≤THC(b)+2K) may have elapsed and the limit signal TLIM 443 pulses to a logic high value. The pulse in limit signal TLIM 443 may set the switching frequency FSW 441, the switching frequency FSW 441 transitions to a logic high value as cycle d terminates. The measured length of half cycle d in the depicted example is shown as:

$$THC(d) = THC(c) + K. \quad (7)$$

For half cycle e, the switching frequency FSW 441 may be logic high and the enable signal EN 442 remains at the logic high value. The maximum length (i.e., limit) for half cycle e, THC(e), may be substantially the sum of the measured half cycle d, THC(d), and the increment value K, or mathematically:

$$THC(e) \leq THC(d) + K. \quad (8)$$

In terms of the measured length of half cycle b, THC(b), and as summarized above, the limit for the measured length of half cycle d in the depicted example is shown as THC(d) =THC(b)+2K. Therefore, substituting for THC(d), the maximum length of half cycle e, THC(e), can also be expressed as:

$$THC(e) \leq (THC(b)+2K)+K, \quad (9)$$

$$THC(e) \leq THC(b)+3K. \quad (10)$$

In other words, the maximum half cycle e, THC(e), can also be expressed as the sum of half cycle b, THC(b), plus three times the increment value K in the depicted example. Expressed in terms of the limit signal TLIM 443, the maximum length of half cycle e, THC(e) is less than or equal to the limit of half cycle e TLIM(e) and the limit of half cycle e TLIM(e) may be expressed as the sum of half cycle b, THC(b), plus three times the increment value K in the depicted example:

$$THC(e) \leq TLIM(e) \quad (11)$$

$$\text{where, } TLIM(e)=THC(b)+3K \quad (12)$$

Time t4 463 corresponds to the elapsed length of time for the maximum length of half cycle e, TLIM(e)=THC(d)+K=THC(b)+3K, and the dashed pulse 478 is representative of where the limit signal TLIM 443 would have pulsed to a logic high value indicating when the maximum length for half cycle e would have elapsed had half cycle e reached its maximum half cycle. However, at time t3 462 the secondary controller, via the control loop clock generator, may determine to end the half cycle e. The termination of the half cycle e before the maximum limit for half cycle e was reached may be due to a number of factors, such as an abnormal event detected or the power requirements of the output has decreased and less energy needs to be delivered. As such, at time t3 462, the switching frequency FSW 441 transitions to a logic low value, half cycle e ends, and half cycle f begins. Half cycle e is therefore terminated before the limit TLIM(e) was reached and the measured value of this shorter cycle is recorded as the length of half cycle e, THC(e).

For half cycle f, which in the depicted example begins at time t3 462, the switching frequency FSW 441 may be logic low and the enable signal EN 442 remains logic high. The maximum length (i.e., limit) for half cycle f, THC(f), is substantially the sum of the measured half cycle e, THC(e), and the fixed value K, or mathematically:

$$THC(f) \leq THC(e)+K. \quad (13)$$

Since the half cycle e ended prior to reaching its maximum limit in this example, the maximum limit for half cycle f is not expressed in terms of the length of half cycle b, THC(b). Instead, at time t5, the maximum length for half cycle f (i.e., THC(f)≤THC(e)+K) has elapsed, and the limit signal TLIM 443 pulses to a logic high value terminating half cycle f. The pulse in limit signal TLIM 443 sets the switching frequency FSW 441, the switching frequency FSW 441 transitions to a logic high value, and cycle f has ended. The measured length of cycle f in the depicted example is shown as:

$$THC(f)=THC(e)+K. \quad (14)$$

Figure 5:
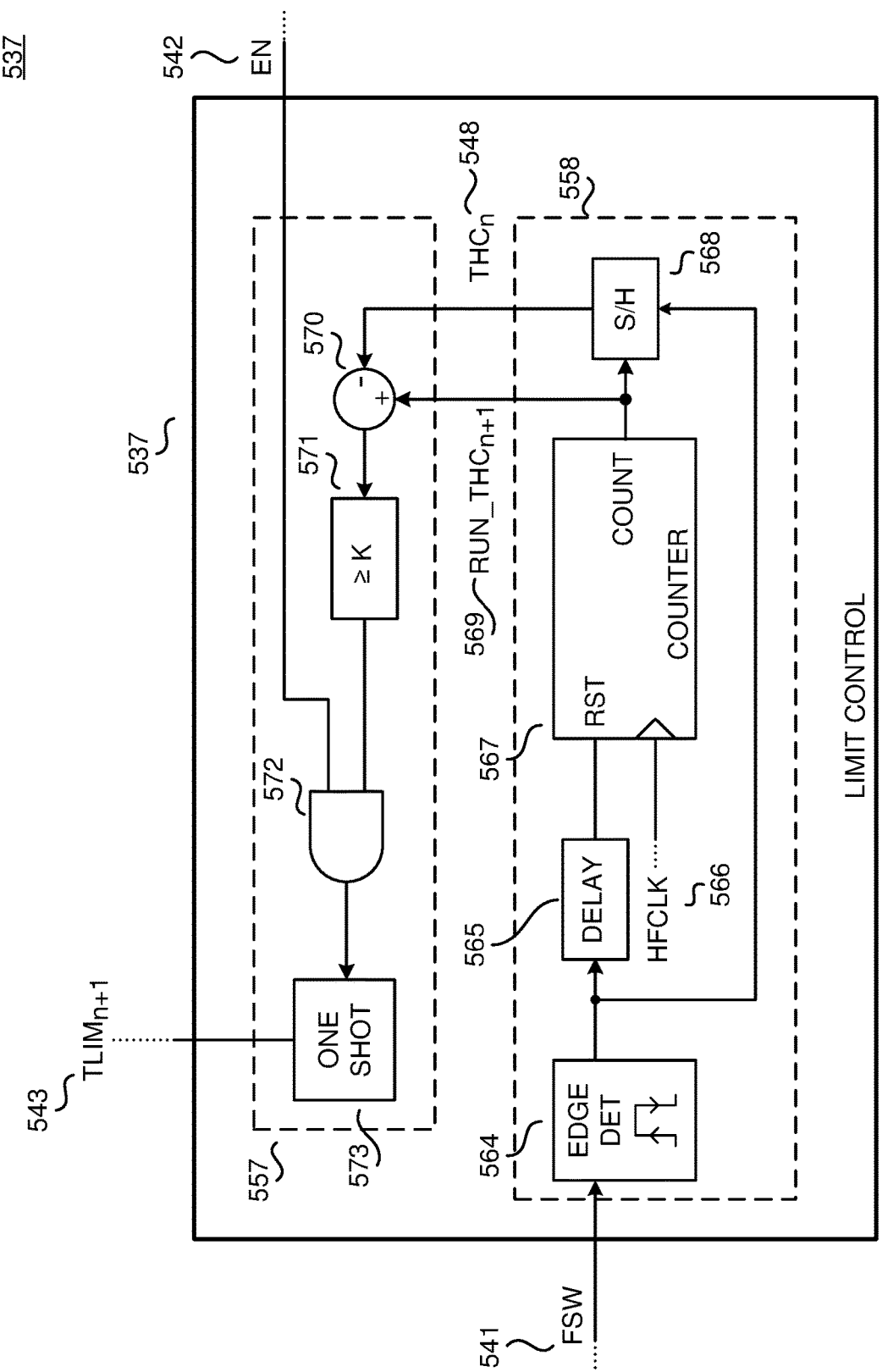
FIG. 5 illustrates an example functional block diagram of the limit control of FIGS. 3A and 3B in accordance with the teachings of the present invention.

FIG. 5 illustrates an example limit control 537 including a digital cycle counter/timer 558 and limit generator 557 in accordance with the teachings of the present invention, however, an analog timing circuit can also be used for counter/timer 558. It is appreciated that limit control 537 of FIG. 5 may be an example of the limit control discussed previously, and that similarly named and numbered elements referenced below may be coupled and function similar to as described above. In the example of FIG. 5, the cycle counter/timer 558 included in limit control 537 is shown as including an edge detector 564, delay 565, counter 567, and sample and hold 568.

The edge detector 564 receives the input switching frequency signal FSW 541 and detects both the leading and trailing edges of the switching frequency signal FSW 541. In one example, edge detector 564 outputs a pulse at every leading and trailing edge of the switching frequency signal FSW 541. The output of the edge detector 564 is received by the delay circuit 565 and sample and hold circuit 568. The sample and hold circuit 568 may be implemented with a multi-bit latch.

The counter 567 is shown as coupled to the delay circuit 565 and receives a delayed version of the edge pulses output from the edge detector 564 at its reset input. The counter may also be coupled to receive a high frequency clock signal HFCLK 566 at its clock input. The sample and hold circuit 568 is coupled to receive the output COUNT from the counter 567 and the output of the edge detector 564.

In operation, the edge detector 564 outputs a pulse for every leading and trailing edge of the switching frequency signal FSW 541. In response to a pulse output from the edge detector 564, the sample and hold circuit 568 samples and holds the COUNT value (or timer value if using an analog timing circuit) output from the counter 567. The pulse output from the edge detector 564 may also be delayed through delay circuit 565 to reset the counter 567. As such, the sample and hold circuit 568 is coupled to sample and hold the COUNT value of the half cycle before the counter 567 is reset through delay circuit 565. The counter 567 counts the number of high frequency clock HFCLK 566 edges that occur between the delayed pulses output from the edge detector 564. In other words, the counter 567 counts the number of high frequency clock HFCLK 566 between edges of the switching frequency signal FSW 541. Therefore, at any given time, the COUNT output of the counter 567 is the running count $RUN\_THC_{n+1}$ 569 of the current half cycle, while the output of the sample and hold 568 is the measured count of the previous half cycle $THC_n$ 548.

The limit generator 557 is shown as including an arithmetic operator 570, a comparator 571, AND gate 572, and monostable multivibrator 573, which may also be referred to as a one shot. As shown, the arithmetic operator 570 is coupled to receive the measured count of the previous half cycle $THC_n$ 548 from the sample and hold circuit 568, and the running count $RUN\_THC_{n+1}$ 569 of the current half cycle, which is the COUNT output from the counter 567. In operation, the arithmetic operator 570 may output the difference between the running count $RUN\_THC_{n+1}$ 569 of the current half cycle and the measured count of the previous half cycle $THC_n$ 548. The difference output by arithmetic operator 570 is received by comparator 571.

Comparator 571 receives the difference between the running count $RUN\_THC_{n+1}$ 569 of the current half cycle and the measured count of the previous half cycle $THC_n$ 548 from the arithmetic operator 570 and compares the difference to the fixed value K. If the difference is greater than or equal to the fixed value K, comparator 571 outputs a logic high value. AND gate 572 is coupled to receive the enable signal EN 542 and the output of comparator 571. The output of AND gate 572 is received by one shot 573, which outputs the limit signal TLIM 543. If the output of comparator 571 is logic high, which indicates that the difference between running count $RUN\_THC_{n+1}$ 569 of the current half cycle and the measured count of the previous half cycle $THC_n$ 548 is greater than or equal to the fixed value K, and if the enable signal EN 542 is logic high, which enables the limit generator 557, the output of AND gate 572 is logic high, which triggers the one shot 573 to output a pulse in the limit signal $TLIM_{n+1}$ 543.

Figure 6A:
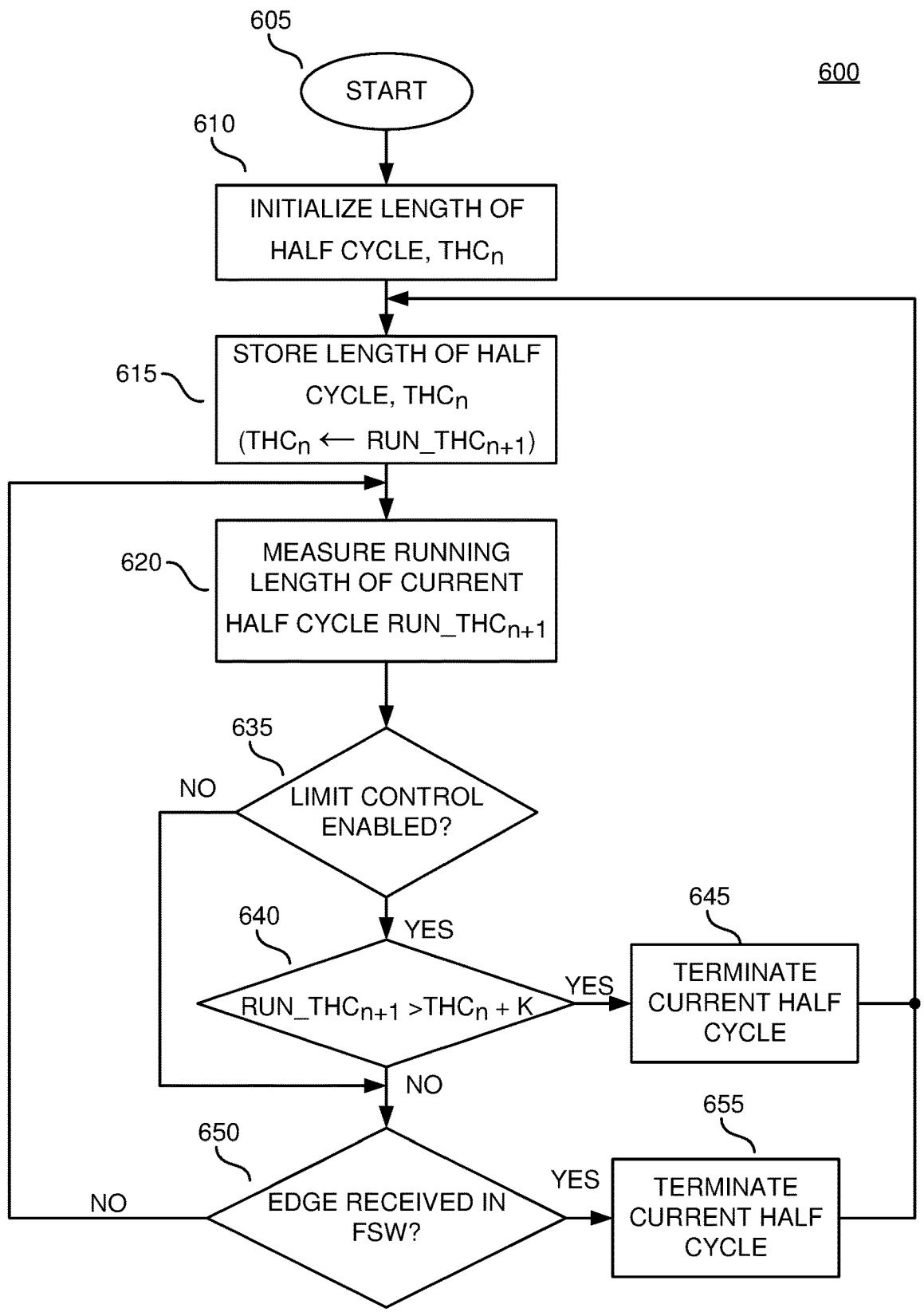
FIG. 6A illustrates an example flow diagram representing the function of the example secondary controller with limit control of FIGS. 1A and 3A in accordance with the teachings of the present invention.

FIG. 6A illustrates an example flow diagram 600 representing the processing of the example secondary controller with limit control of FIGS. 1A, 1B, 3A, and 3D in accordance with the teachings of the present invention. Accordingly, similarly named or numbered elements referenced below may be coupled and function similar to as described above. As shown in the depicted example, the process begins at process block 605. At process block 610, the length of the half cycle $THC_n$ is initialized. During this block, the secondary controller may be preset with a value for the half cycle $THC_n$. At process block 615, the length of the half cycle $THC_n$ is stored. The process continues to process block 620 where the running length of the current half cycle, $RUN\_THC_{n+1}$ is measured. Or in other words, the instantaneous value of the current half cycle is measured.

At decision block 635, it is determined whether the limit control is enabled. If the decision block 635 determines that the limit control is enabled, the process continues to decision block 640. At decision block 640, it is determined if the running length of the current half cycle $RUN\_THC_{n+1}$ is greater than the sum of the stored length of the previous half cycle $THC_n$ and the increment value K, or mathematically: $RUN\_THC_{n+1} > THC_n + K$. If the running length of the current half cycle $RUN\_THC_{n+1}$ is greater than the sum of the stored length of the previous half cycle $THC_n$ and the increment value K, the process continues to process block 645 where the current half cycle is terminated. The process then returns to process block 615 and the length of the half cycle is stored. In the example shown, the running length of the current half cycle $RUN\_THC_{n+1}$ is stored as $THC_n$. The process then continues on to process block 620 as discussed.

If, however, the decision block 635 determines that the limit control is not enabled or if decision block 640 determines that the running length of the current half cycle $RUN\_THC_{n+1}$ is not greater than the stored length of the previous half cycle $THC_n$ and the increment value K, then the process continues to decision block 650. At decision block 650, it is determined if an edge was received in the switching frequency signal FSW. If no edge was received, the process returns to process block 620 and continues to measure the length of the current half cycle, THCn+1 and the process continues as discussed above. If an edge was received, the process continues to process block 655 and the current half cycle is terminated. The process then returns to process block 615 and the length of the half cycle is stored. In the example shown, the running length of the current half cycle $RUN\_THC_{n+1}$ is stored as $THC_n$. If an edge was not received at decision block 650, the process returns to process block 620 where the running length of the current half cycle $RUN\_THC_{n+1}$ is measured and the process continues as discussed above.

Figure 6B:
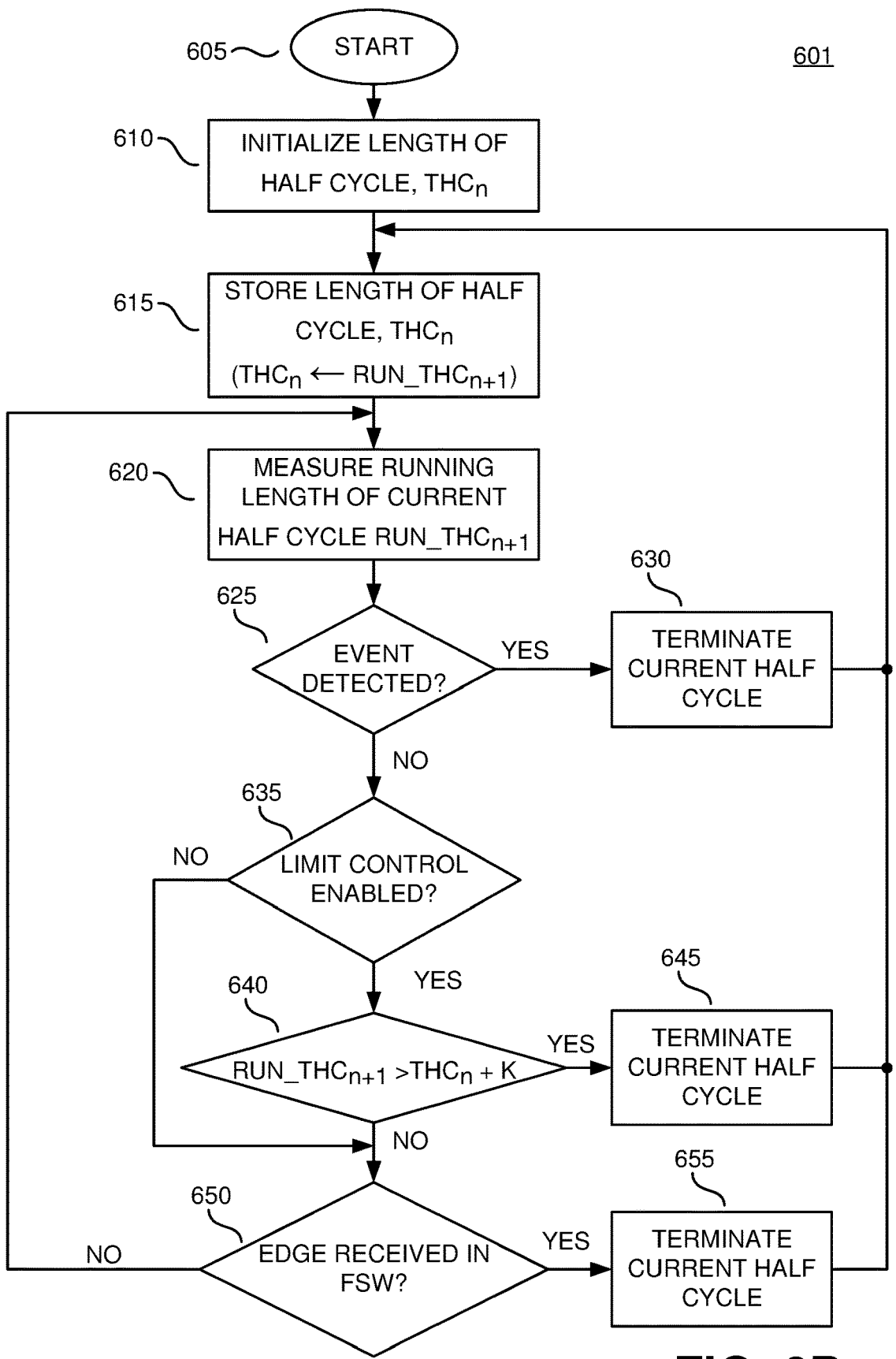
FIG. 6B illustrates an example flow diagram representing the function of the example secondary controller with limit control of FIGS. 1B and 3B in accordance with the teachings of the present invention.

FIG. 6B illustrates an example flow diagram 601 representing the processing of the example secondary controller with limit control of FIGS. 1C, 3B, 3C, and 3D in accordance with the teachings of the present invention. Accordingly, similarly named or numbered elements referenced below may be coupled and function similar to as described above. As shown in the depicted example, the process begins at process block 605. At process block 610, the length of the half cycle $THC_n$ is initialized. During this block, the secondary controller may be preset with a value for the half cycle $THC_n$. At process block 615, the length of the half cycle $THC_n$ is stored. The process continues to process block 620 where the running length of the current half cycle, $RUN\_THC_{n+1}$ is measured. Or in other words, the instantaneous value of the current half cycle is measured.

At decision block 625, it is determined if an event is detected. In one example, the event may be a hard switching event which may be detected directly or indirectly. If an event has been detected, the process continues to process block 630 and the current half cycle is terminated. The process then returns to process block 615 and the length of the half cycle is stored. In the example shown, the running length of the current half cycle $RUN\_THC_{n+1}$ is stored as $THC_n$. The process then continues on to process block 620 as discussed. If no event is detected, the process continues on to decision block 635.

At decision block 635, it is determined whether the limit control is enabled. If the decision block 635 determines that the limit control is enabled, the process continues to decision block 640. At decision block 640, it is determined if the running length of the current half cycle $RUN\_THC_{n+1}$ is greater than the sum of the stored length of the previous half cycle $THC_n$ and the increment value K, or mathematically: $RUN\_THC_{n+1} > THC_n + K$. If the running length of the current half cycle $RUN\_THC_{n+1}$ is greater than the sum of the stored length of the previous half cycle $THC_n$ and the increment value K, the process continues to process block 645 where the current half cycle is terminated. The process then returns to process block 615 and the length of the half cycle is stored. In the example shown, the running length of the current half cycle $RUN\_THC_{n+1}$ is stored as $THC_n$. The process then continues on to process block 620 as discussed.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A controller for use in a power converter, comprising:
   a control loop clock generator configured to generate a switching frequency signal in response to a load signal and a limit signal, wherein the switching frequency signal is responsive to an output load of the power converter and the limit signal is representative of a maximum length of a current half cycle of the switching frequency signal;
   a limit control configured to generate the limit signal in response to the switching frequency signal, wherein a rate of change between consecutive half cycles of the switching frequency signal is controlled in response to the limit signal to prevent a length of the current half cycle from exceeding the maximum length; and
   a request transmitter circuit configured to generate a request signal in response to the switching frequency signal to control switching of a switching circuit coupled to an energy transfer element and an input of the power converter.

2. The controller of claim 1, wherein the control loop clock generator includes a voltage controlled oscillator.

3. The controller of claim 1, wherein the control loop clock generator is configured to generate the switching frequency signal in response to a sense signal representative of a characteristic of the power converter.

4. The controller of claim 3, wherein the limit control is further configured to receive the sense signal to generate the limit signal.

5. The controller of claim 3, wherein the sense signal is representative of at least one of an input voltage of the power converter, an output power of the power converter, an input power of the power converter, or a power processed by the power converter.

6. The controller of claim 1, further comprising a first comparator configured to generate an enable signal in response to the load signal and a load threshold, wherein the limit control is further configured to generate the limit signal in response to the enable signal.

7. The controller of claim 4, further comprising:
an event sense circuit configured to generate an event signal in response to an event detected in the power converter; and
a first OR gate configured to output the enable signal in response to an output of the first comparator and the event signal.

8. The controller of claim 7, wherein the control loop clock generator is further configured to receive the event signal and to terminate the current half cycle by transitioning the switching frequency signal in response to event signal.

9. The controller of claim 7, wherein the limit control is further configured to receive the event signal and to generate the limit signal in response to the event signal.

10. The controller of claim 1, further comprising a transconductance amplifier including a first input configured to receive a feedback signal, a second input configured to receive a feedback reference signal, and an output coupled to a compensation circuit coupled to an output return of the power converter, wherein the transconductance amplifier is configured to generate the load signal in response to the feedback signal, the feedback reference signal, and the compensation circuit.

11. The controller of claim 3, wherein the control loop clock generator comprises:
a reference generator configured to generate a first reference and a second reference in response to the load signal;
a second comparator configured to compare the first reference and the sense signal;
a third comparator configured to compare the second reference and the sense signal;
a first AND gate configured to receive the switching frequency signal and the limit signal;
a NOR gate configured to receive the switching frequency signal and an inverted limit signal;
a second OR gate configured to receive an output of the second comparator and an output of the first AND gate;
a third OR gate configured to receive an output of the third comparator and an output of the NOR gate; and
a latch including a reset input coupled to an output of the second OR gate and a set input coupled to an output of the third OR gate, wherein an output of the latch is configured to generate the switching frequency signal.

12. The controller of claim 11, wherein the second OR gate and the third OR gate are further configured to receive an event signal from an event sense circuit, wherein the event sense circuit is configured to generate the event signal in response to an event detected in the power converter.

13. The controller of claim 1, wherein the limit control comprises:
a limit generator configured to generate the limit signal in response to an enable signal and a measured length of a half cycle of the switching frequency signal; and
a cycle timer configured to receive the switching frequency signal to output the measured length of the half cycle of the switching frequency signal.

14. The controller of claim 13, wherein the cycle timer is further configured to receive a sense signal to determine the measured length of the half cycle of the switching frequency signal, wherein the sense signal is representative of a characteristic of the power converter.

15. The controller of claim 13, wherein the cycle timer comprises:
an edge detector configured to receive the switching frequency signal to detect an edge in the switching frequency signal;
a delay circuit coupled to an output of the edge detector to generate a delayed output of the edge detector;
a counter configured to be clocked in response to a clock signal, wherein the counter is further configured to be reset in response to the delayed output of the edge detector, wherein a count output of the counter is representative of a running count of the current half cycle; and
a sample and hold configured to sample the count output of the counter in response to the output of the edge detector to output a measured count of a previous half cycle.

16. The controller of claim 15, wherein the limit generator comprises:
an arithmetic operator configured to receive the running count of the current half cycle and the measured count of the previous half cycle, wherein the arithmetic operator is further configured to generate a difference between the running count of the current half cycle and the measured count of the previous half cycle;
a fourth comparator configured to compare the difference between the running count of the current half cycle and the measured count of the previous half cycle with a fixed value K;
a second AND gate configured to receive the enable signal and an output of the fourth comparator; and
a one shot device configured to generate the limit signal in response to an output of the second AND gate.

17. The controller of claim 13,
wherein the cycle timer further includes a timer configured to receive the switching frequency signal, wherein the timer is further configured to output a running timer of the current half cycle and a stored timer of a previous half cycle of the switching frequency signal; and
wherein the limit generator further includes an arithmetic operator configured to receive the running timer of the current half cycle and the stored timer of the previous half cycle, wherein the arithmetic operator is further configured to generate a difference between the running timer and the stored timer.

18. A power converter, comprising:
an energy transfer element coupled between an input of the power converter and an output of the power converter;
a switching circuit coupled to the energy transfer element and the input of the power converter; and
a controller configured to control switching of the switching circuit to control a transfer of energy from the input of the power converter to the output of the power converter, wherein the controller includes:
    a control loop clock generator configured to generate a switching frequency signal in response to a load signal and a limit signal, wherein the load signal is responsive to an output load of the power converter, and wherein the limit signal is representative of a maximum length of a current half cycle of the switching frequency signal;
    a limit control configured to generate the limit signal in response to the switching frequency signal, wherein a rate of change between consecutive half cycles of the switching frequency signal is controlled in response to the limit signal to prevent a length of the current half cycle from exceeding the maximum length; and
    a request transmitter circuit configured to generate a request signal in response to the switching frequency signal to control switching of the switching circuit.

19. The power converter of claim 18, wherein the power converter is a resonant converter, wherein the power converter further comprises a resonant tank circuit including a tank inductance coupled to a tank capacitance that is coupled to the switching circuit, and wherein the switching circuit includes a high side switch and a low side switch coupled to the resonant tank circuit.

20. The power converter of claim 19, wherein the controller is a secondary controller, wherein the power converter further comprises a primary controller galvanically isolated from the secondary controller, wherein the primary controller is configured to receive the request signal from the secondary controller to generate a high side drive signal to control switching of the high side switch and a low side drive signal to control switching of the low side switch.

21. The power converter of claim 18, wherein the control loop clock generator is further configured to generate a switching frequency signal in response to a sense signal representative of a characteristic of the power converter.

22. The power converter of claim 21, wherein the limit control is further configured to receive the sense signal to generate the limit signal.

23. The power converter of claim 21 wherein the sense signal is representative of at least one of an input voltage of the power converter, an output power of the power converter, an input power of the power converter, or a power processed by the power converter.

24. The power converter of claim 18, wherein the controller further comprises a first comparator configured to generate an enable signal in response to the load signal and a load threshold, wherein the limit control is further configured to generate the limit signal in response to the enable signal.

25. The power converter of claim 24, wherein the controller further comprises:
    an event sense circuit configured to generate an event signal in response to events detected in the power converter or to a startup condition; and
    a first OR gate coupled to output the enable signal in response to an output of the first comparator and the event signal.

26. The power converter of claim 25, wherein the control loop clock generator is further configured to receive the event signal to terminate the current half cycle by transitioning the switching frequency signal in response to the event signal.

27. The power converter of claim 25, wherein the limit control is further configured to receive the event signal to generate the limit signal in response to the event signal.

28. The power converter of claim 18, wherein the controller further comprises a transconductance amplifier including a first input configured to receive a feedback signal and a second input configured to receive a feedback reference signal, wherein the transconductance amplifier is further configured to generate the load signal in response to the feedback signal and the feedback reference signal.

29. The power converter of claim 28, further comprising a compensation circuit coupled to an output return of the power converter and an output of the transconductance amplifier, wherein the compensation circuit comprises:
    a resistor coupled to a first capacitor coupled between the output return of the power converter and the controller; and
    a second capacitor coupled in parallel across the resistor and the first capacitor.

30. The power converter of claim 18, wherein the control loop clock generator comprises:
    a reference generator configured to generate a first reference and a second reference in response to the load signal;
    a second comparator configured to compare the first reference and a sense signal representative of a characteristic of the power converter;
    a third comparator configured to compare the second reference and the sense signal;
    a first AND gate configured to receive the switching frequency signal and the limit signal;
    a NOR gate configured to receive the switching frequency signal and an inverted limit signal;
    a second OR gate configured to receive an output of the second comparator and an output of the first AND gate;
    a third OR gate configured to receive an output of the third comparator and an output of the NOR gate; and
    a latch including a reset input coupled to an output of the second OR gate and a set input coupled to an output of the third OR gate, wherein an output of the latch is configured to generate the switching frequency signal.

31. The power converter of claim 30, wherein the second OR gate and the third OR gate are further configured to receive an event signal from an event sense circuit, wherein the event sense circuit is configured to generate the event signal in response to an event detected in the power converter.

32. The power converter of claim 18, wherein the limit control comprises:
    a limit generator configured to generate the limit signal in response to an enable signal and a measured length of a half cycle of the switching frequency signal; and
    a cycle timer configured to receive the switching frequency signal and to output the measured length of the half cycle of the switching frequency signal.

33. A method of controlling a switching of a power converter, comprising:
    generating a switching frequency signal in response to an output load of the power converter or a sense signal representative of a characteristic of the power converter;
    measuring a length of a current half cycle of the switching frequency signal;
    setting a length of a half cycle of the switching frequency signal in response to the switching frequency signal if a limit control is not enabled;

calculating a maximum length of a next half cycle of the switching frequency signal based on a length of a current half cycle incremented by a value K if the limit control is enabled; and switching the power converter in response to the switching frequency signal.

34. The method of claim 33, further comprising:

determining if an event is detected; and calculating the maximum length of the next half cycle of the switching frequency signal based on the length of the current half cycle decremented by a value Z if the event is detected.

35. The method of claim 34, further comprising terminating the current half cycle if the event is detected.

36. The method of claim 33, wherein the sense signal is representative of at least one of an input voltage of the power converter, an output power of the power converter, an input power of the power converter, or a power processed by the power converter.

37. The method of claim 33, wherein the value K is variable.

38. The method of claim 33, wherein the value K is fixed.

* * * * *